(12) United States Patent
Ezoory

(10) Patent No.: US 11,053,922 B2
(45) Date of Patent: Jul. 6, 2021

(54) TURBINE ENERGY DEVICE

(71) Applicant: Doron E. Ezoory, Tel-Aviv (IL)

(72) Inventor: Doron E. Ezoory, Tel-Aviv (IL)

(*) Notice: Subject to any disclaimer, the term of this patent is extended or adjusted under 35 U.S.C. 154(b) by 0 days.

(21) Appl. No.: 15/118,492

(22) PCT Filed: Feb. 11, 2015

(86) PCT No.: PCT/IL2015/050154
§ 371 (c)(1),
(2) Date: Aug. 29, 2016

(87) PCT Pub. No.: WO2015/121857
PCT Pub. Date: Aug. 20, 2015

(65) Prior Publication Data
US 2018/0135600 A1 May 17, 2018

(30) Foreign Application Priority Data

Feb. 12, 2014 (IL) .......................... 230934

(51) Int. Cl.
| | |
|---|---|
| *F03D 9/25* | (2016.01) |
| *H02K 7/116* | (2006.01) |
| *F03D 1/00* | (2006.01) |
| *F03D 15/00* | (2016.01) |
| *F03D 3/00* | (2006.01) |
| *H02K 7/18* | (2006.01) |
| *H02K 7/10* | (2006.01) |
| *F03D 3/04* | (2006.01) |

(52) U.S. Cl.
CPC .............. *F03D 9/25* (2016.05); *F03D 1/00* (2013.01); *F03D 3/005* (2013.01); *F03D 15/00* (2016.05); *H02K 7/1004* (2013.01); *H02K 7/116* (2013.01); *H02K 7/183* (2013.01); *H02K 7/1823* (2013.01); *F03D 3/0409* (2013.01); *F05B 2240/40* (2013.01); *F05B 2260/4021* (2013.01); *F05B 2260/4031* (2013.01); *Y02E 10/72* (2013.01); *Y02E 10/74* (2013.01)

(58) Field of Classification Search
USPC ...................................................... 290/44, 55
See application file for complete search history.

(56) References Cited

U.S. PATENT DOCUMENTS

| | | | | | |
|---|---|---|---|---|---|
| 1,393,472 | A | * | 10/1921 | Williams | F03B 13/262 290/42 |
| 1,894,357 | A | * | 1/1933 | Manikowske | F03D 1/025 290/44 |
| 2,153,523 | A | * | 4/1939 | Edmonds | F03D 1/025 290/44 |

(Continued)

FOREIGN PATENT DOCUMENTS

| | | |
|---|---|---|
| DE | 19643362 A1 | 4/1998 |
| EP | 2629407 A1 | 8/2013 |

(Continued)

*Primary Examiner* — Pedro J Cuevas

(57) ABSTRACT

A turbine energy device having one or more rotors and one or more stators in one or more generator sets wherein said rotors and stators are adapted to be rotated in opposite directions, by means of gear stages adapted to produce counter-rotation in these elements and to produce high relative rotation rates between said elements according to the gear ratios involved, thereby obtaining increased power density.

2 Claims, 30 Drawing Sheets

(56) References Cited

U.S. PATENT DOCUMENTS

| | | | | |
|---|---|---|---|---|
| 2,177,801 A * | 10/1939 | Erren | H02K 16/005 | 290/55 |
| 2,563,279 A * | 8/1951 | Rushing | F03D 1/025 | 290/55 |
| 2,873,613 A * | 2/1959 | Schulte | B23Q 5/00 | 192/215 |
| 4,039,848 A * | 8/1977 | Winderl | F03D 1/025 | 290/55 |
| 4,056,746 A * | 11/1977 | Burtis | H02K 23/60 | 310/115 |
| 4,291,233 A * | 9/1981 | Kirschbaum | F16H 37/0833 | 290/1 C |
| 5,089,734 A * | 2/1992 | Bickraj | H02K 16/005 | 310/115 |
| 5,495,907 A * | 3/1996 | Data | B60K 6/365 | 180/65.245 |
| 5,506,453 A * | 4/1996 | McCombs | F03D 1/025 | 290/44 |
| 5,760,515 A * | 6/1998 | Burns | F03D 9/00 | 180/65.31 |
| 5,876,181 A * | 3/1999 | Shin | F03D 1/06 | 415/2.1 |
| 6,127,739 A * | 10/2000 | Appa | F01D 1/26 | 290/42 |
| 6,278,197 B1 * | 8/2001 | Appa | F03D 1/025 | 290/54 |
| 6,476,513 B1 * | 11/2002 | Gueorguiev | F03D 1/0608 | 290/43 |
| 6,492,743 B1 * | 12/2002 | Appa | F01D 1/32 | 290/44 |
| 6,504,260 B1 * | 1/2003 | Debleser | F03D 1/025 | 290/44 |
| 6,695,082 B2 * | 2/2004 | Bitsche | B60K 6/26 | 123/179.28 |
| 6,713,893 B2 * | 3/2004 | van der Horn | F03D 1/02 | 290/55 |
| 6,856,042 B1 * | 2/2005 | Kubota | F03D 1/025 | 290/43 |
| 6,945,747 B1 * | 9/2005 | Miller | F03D 1/025 | 415/4.3 |
| 6,952,058 B2 * | 10/2005 | McCoin | F03D 1/025 | 290/44 |
| 6,975,045 B2 * | 12/2005 | Kurachi | H02K 7/183 | 290/44 |
| 7,098,552 B2 * | 8/2006 | McCoin | F03D 1/025 | 290/44 |
| 7,116,006 B2 * | 10/2006 | McCoin | F03D 1/025 | 290/54 |
| 7,262,533 B2 * | 8/2007 | Fiset | H02K 16/00 | 310/113 |
| 7,353,895 B2 * | 4/2008 | Bitsche | B60K 6/26 | 180/292 |
| 7,384,239 B2 * | 6/2008 | Wacinski | F03D 1/025 | 415/123 |
| 7,582,981 B1 * | 9/2009 | Meller | F03D 1/025 | 290/44 |
| 7,687,931 B2 * | 3/2010 | Gasendo | F03B 13/186 | 290/43 |
| 7,709,973 B2 * | 5/2010 | Meller | F03D 1/025 | 290/44 |
| 7,777,360 B2 * | 8/2010 | Hong | F03D 1/025 | 290/44 |
| 7,786,634 B2 * | 8/2010 | Harju | H02K 16/005 | 310/83 |
| 7,821,149 B2 * | 10/2010 | Meller | F03D 1/025 | 290/44 |
| 7,830,033 B2 * | 11/2010 | Meller | F03D 1/025 | 290/44 |
| 7,892,129 B2 * | 2/2011 | Lee | F16H 3/76 | 475/16 |
| 7,923,854 B1 * | 4/2011 | Meller | F03D 1/025 | 290/44 |
| 8,026,626 B1 * | 9/2011 | Meller | H02K 7/08 | 290/55 |
| 8,070,444 B2 * | 12/2011 | Clarke | F03B 3/126 | 290/44 |
| 8,162,611 B2 * | 4/2012 | Perkinson | B64C 11/44 | 416/162 |
| 8,178,991 B2 * | 5/2012 | Smith | F03D 1/025 | 290/44 |
| 8,178,992 B1 * | 5/2012 | Meller | F03D 1/025 | 290/55 |
| 8,264,096 B2 * | 9/2012 | Micu | F03D 1/025 | 290/43 |
| 8,461,713 B2 * | 6/2013 | Sammy | F03D 1/025 | 290/44 |
| 8,536,726 B2 * | 9/2013 | Wadehn | H02K 16/005 | 290/55 |
| 8,568,099 B2 * | 10/2013 | Sabannavar | G01M 13/028 | 416/170 R |
| 8,641,570 B2 * | 2/2014 | Han | H02P 9/04 | 475/170 |
| 8,742,608 B2 * | 6/2014 | Micu | F03D 1/02 | 290/43 |
| 8,742,612 B1 * | 6/2014 | Robbins | F03D 1/00 | 290/54 |
| 8,772,958 B2 * | 7/2014 | Kang | F03D 1/025 | 290/55 |
| 8,829,706 B1 * | 9/2014 | Sammy | F03D 1/025 | 244/207 |
| 8,836,158 B2 * | 9/2014 | Cho | H02P 9/04 | 290/55 |
| 9,184,649 B2 * | 11/2015 | Webster | H02K 16/00 | |
| 9,912,209 B2 * | 3/2018 | Han | F03D 3/002 | |
| 2002/0140235 A1 | 10/2002 | van der Horn | | |
| 2004/0096327 A1 * | 5/2004 | Appa | F03D 1/025 | 416/1 |
| 2006/0093482 A1 * | 5/2006 | Wacinski | F03D 1/025 | 416/128 |
| 2008/0197639 A1 * | 8/2008 | Brander | F03D 1/025 | 290/55 |
| 2008/0265585 A1 * | 10/2008 | Torres Martinez | F03D 1/025 | 290/55 |
| 2010/0066095 A1 * | 3/2010 | Meller | F03D 1/025 | 290/55 |
| 2010/0090468 A1 * | 4/2010 | Hong | F03D 1/025 | 290/55 |
| 2010/0225190 A1 | 9/2010 | Huang | | |
| 2010/0259050 A1 * | 10/2010 | Meller | F03D 1/025 | 290/55 |
| 2012/0068472 A1 | 3/2012 | Wadehn | | |
| 2012/0282092 A1 * | 11/2012 | Swist | F03D 1/025 | 416/1 |

FOREIGN PATENT DOCUMENTS

| | | |
|---|---|---|
| GB | 2341646 A | 3/2000 |
| GB | 2413159 A | 10/2005 |
| KR | 20100077135 A | 7/2010 |
| SU | 1663703 A1 | 7/1991 |
| WO | WO-2013095017 A1 | 6/2013 |

* cited by examiner

TURBINE ENERGY DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not Applicable

STATEMENT REGARDING PRIOR DISCLOSURES BY THE INVENTOR OR A JOINT INVENTOR

Not Applicable

BACKGROUND OF THE INVENTION

Turbine energy devices have been employed for centuries if not millennia. Increasing the efficiency thereof has been a major trend of late due to increasing entry of such devices into use as significant suppliers of energy to the grid and/or for off-grid use.

There is thus a long-felt need for novel turbine energy devices of increased efficiency and power density.

An example of a prior art device is disclosed in U.S. Pat. No. 4,291,233.

FIELD OF THE INVENTION

The present invention relates to the field of generators and wind energy but can be applied to any type of fluid flow such as liquid flow or otherwise and any kind of turbine.

BRIEF SUMMARY OF THE INVENTION

The device comprises a novel turbine energy device using counter-rotating rotor and stator for increased relative speed, allowing increased efficiency and/or power density.

The foregoing embodiments of the invention have been described and illustrated in conjunction with systems and methods thereof, which are meant to be merely illustrative, and not limiting.

Furthermore just as every particular reference may embody particular methods/systems, yet not require such, ultimately such teaching is meant for all expressions notwithstanding the use of particular embodiments.

BRIEF DESCRIPTION OF THE SEVERAL VIEWS OF THE DRAWING(S)

Embodiments and features of the present invention are described herein:

(*) The devices depicted in FIGS. 1 to 8 depict important components of my invention, and are essential to understanding the invention, but fall only partially within the scope of my claimed invention.

Figure 24:
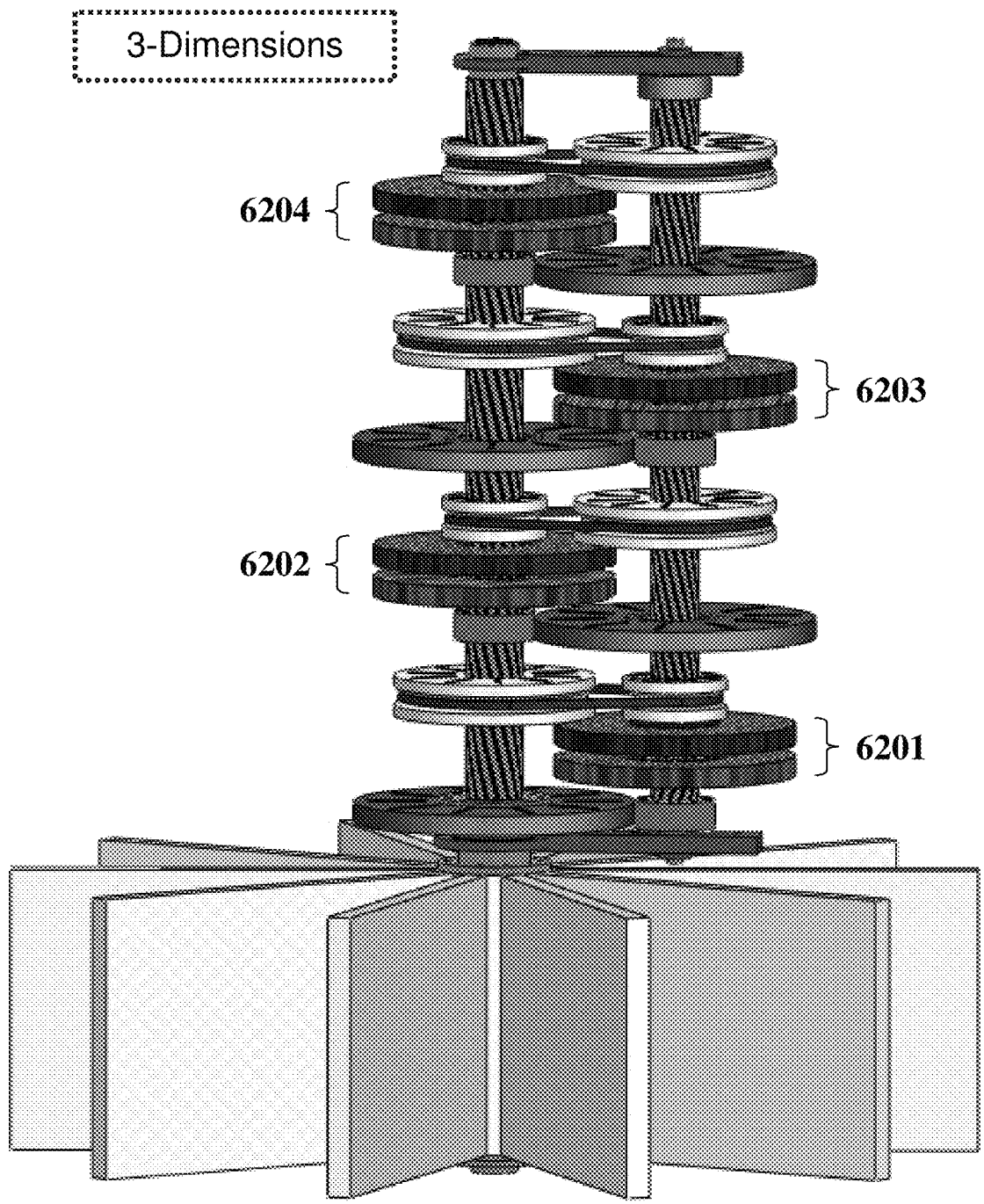
Figure 25:
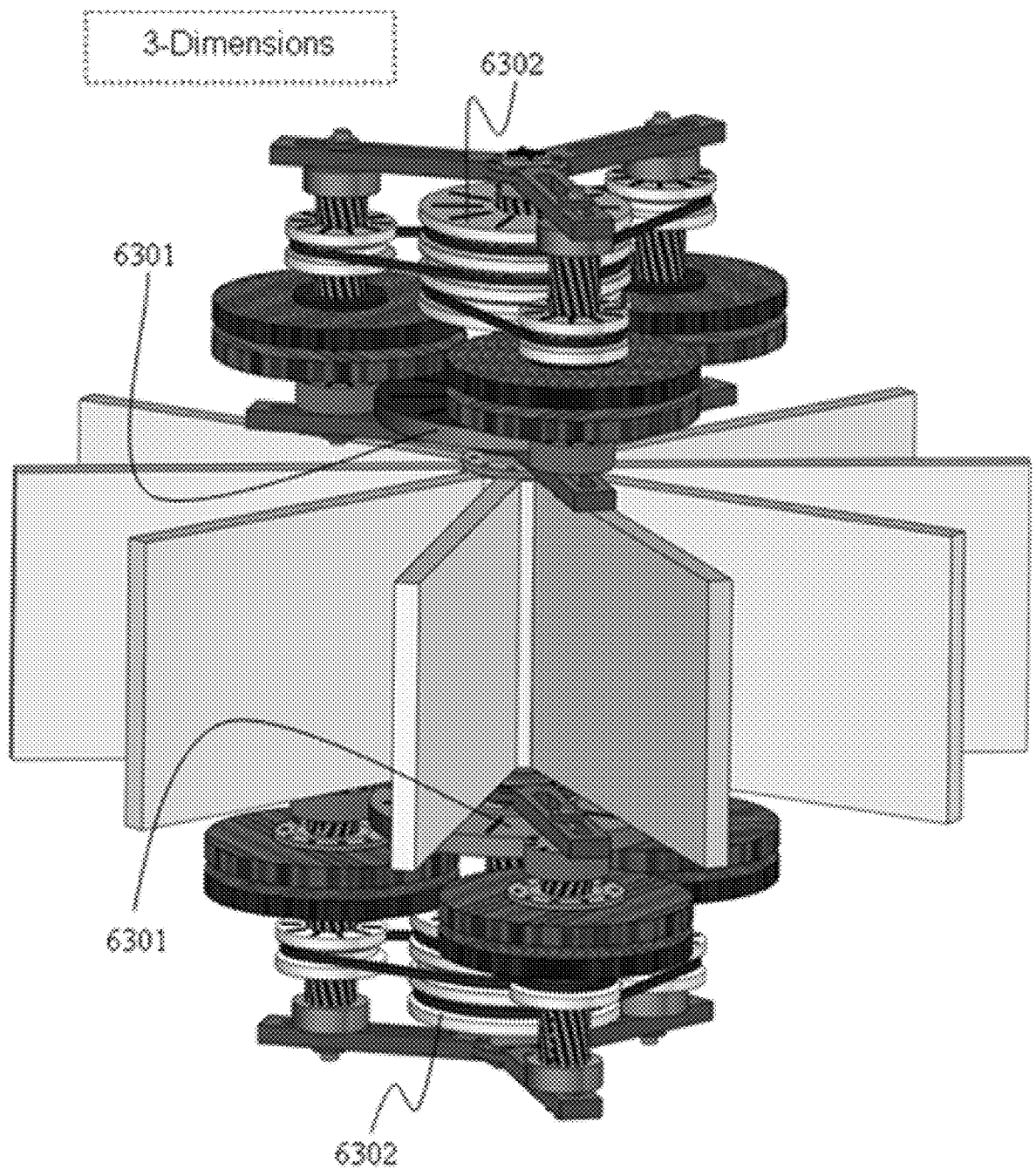
Figure 26:
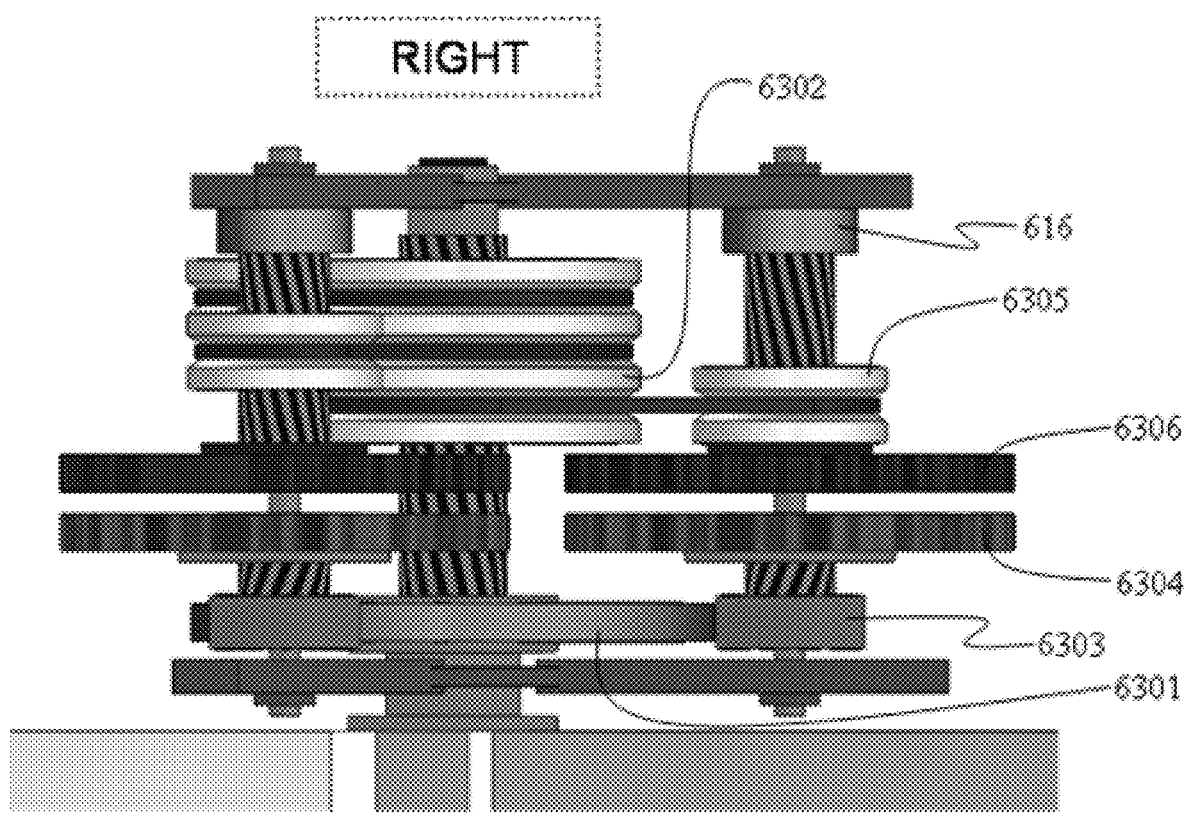
Figure 27:
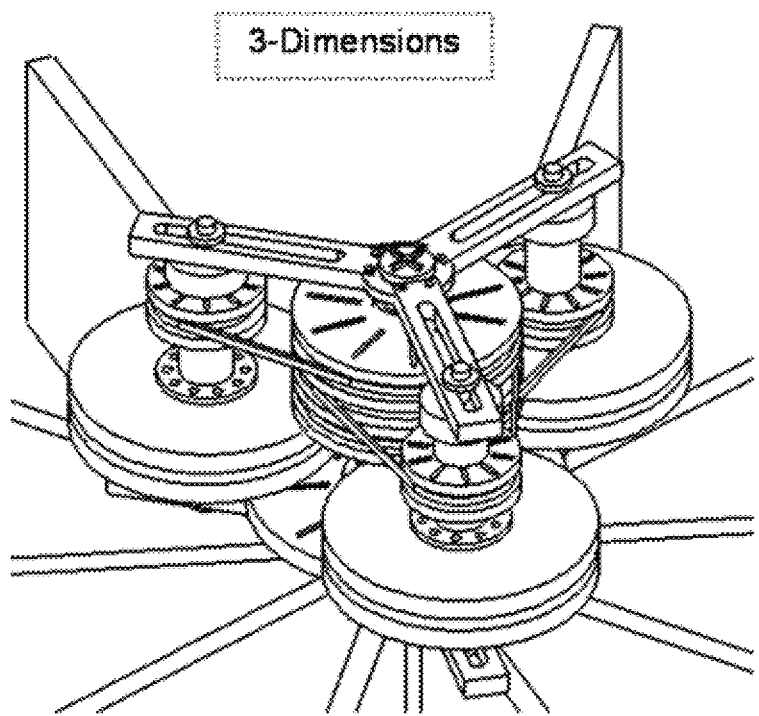
Figure 28:
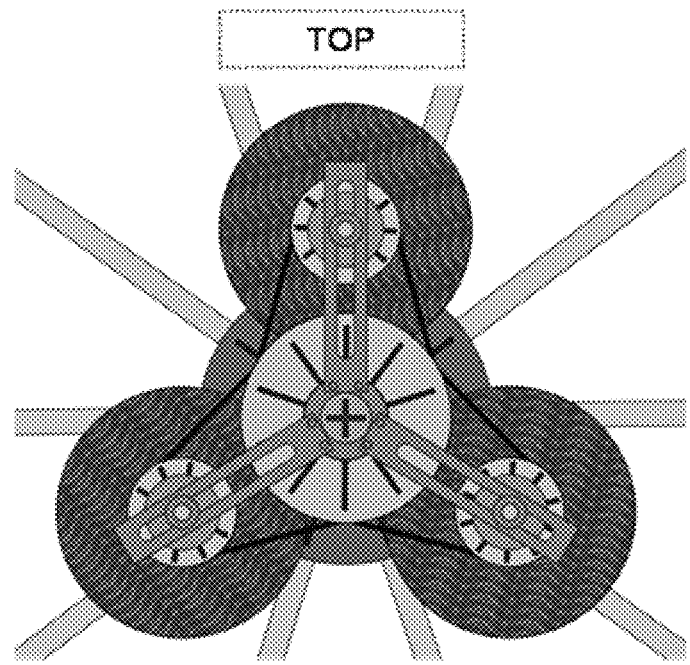
Figure 29:
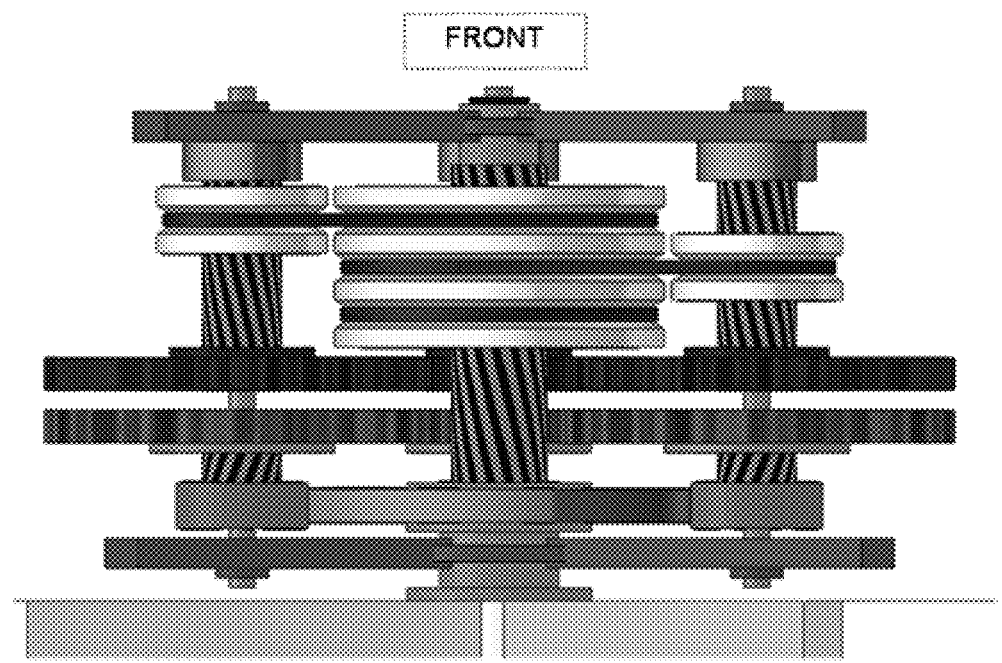
Figure 30:
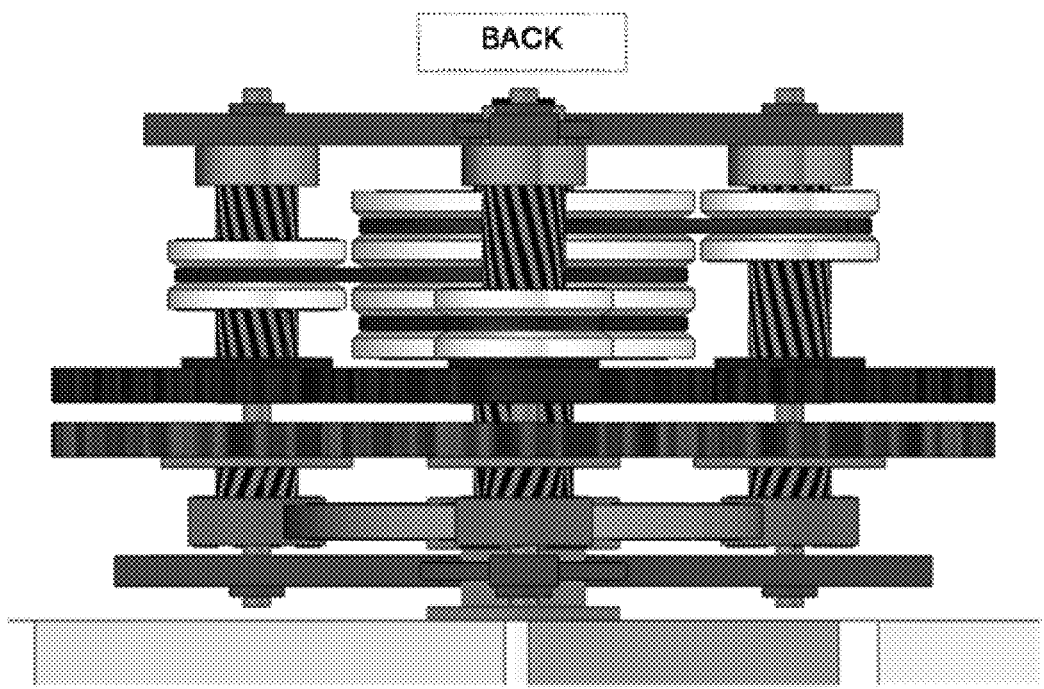
Figure 31:
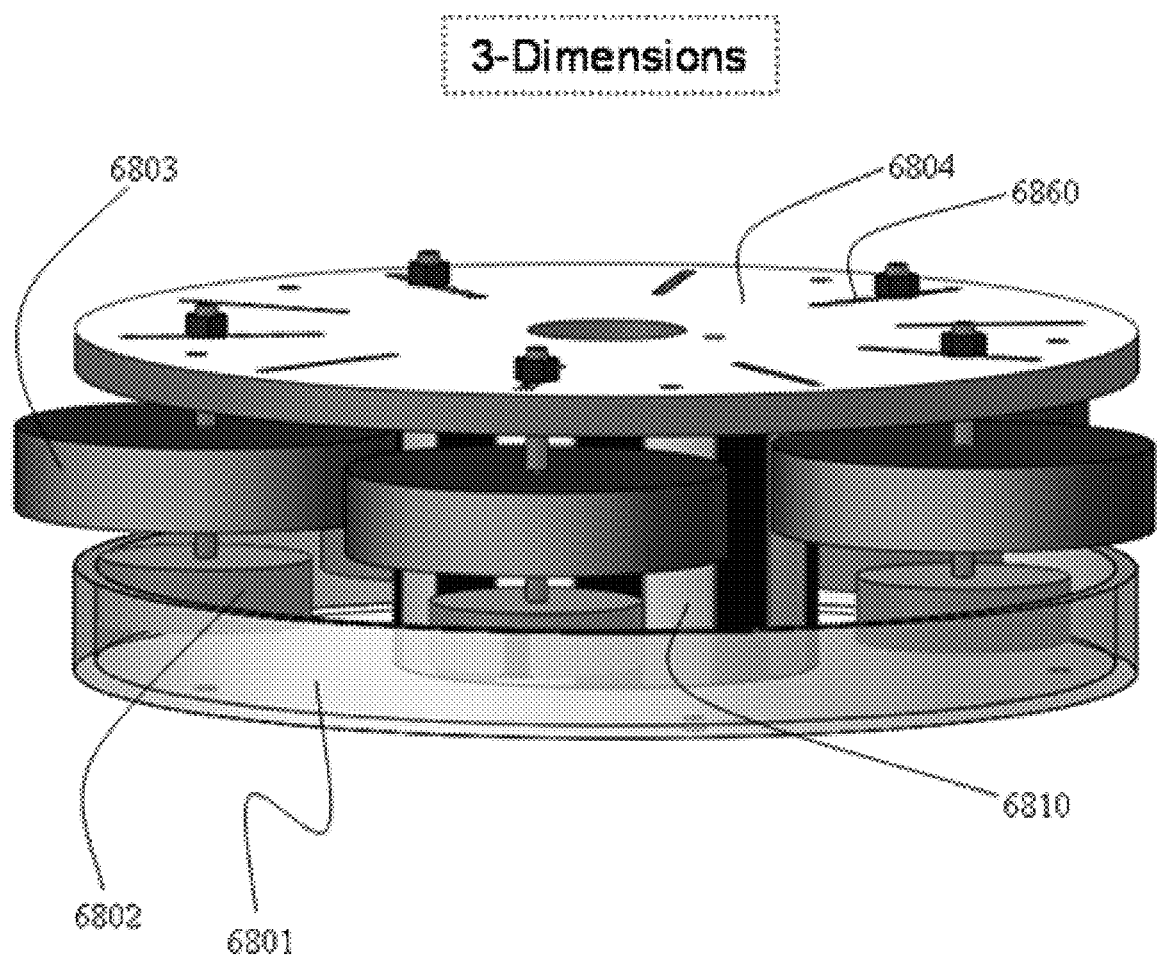
Figure 32:
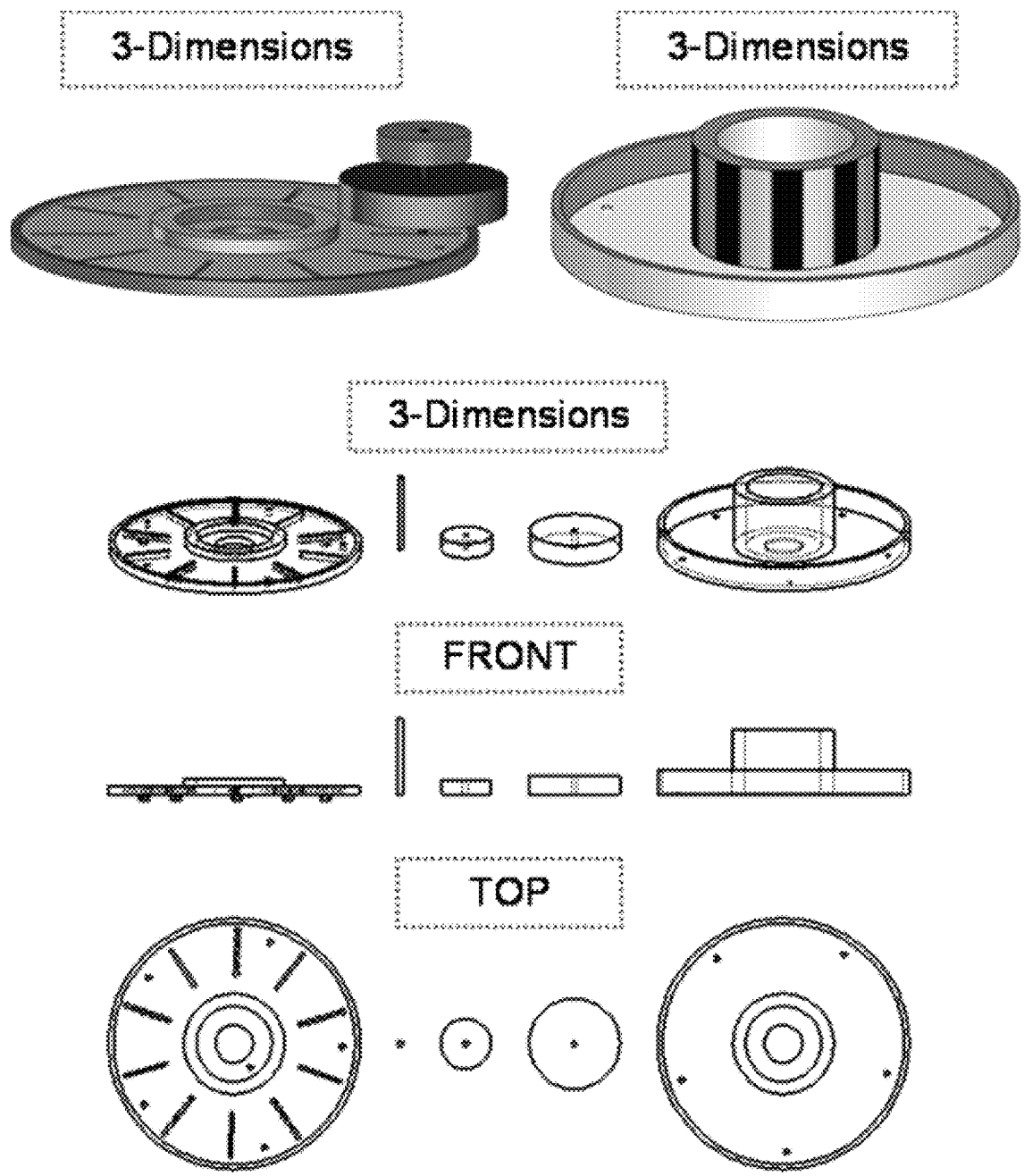
Figure 33:
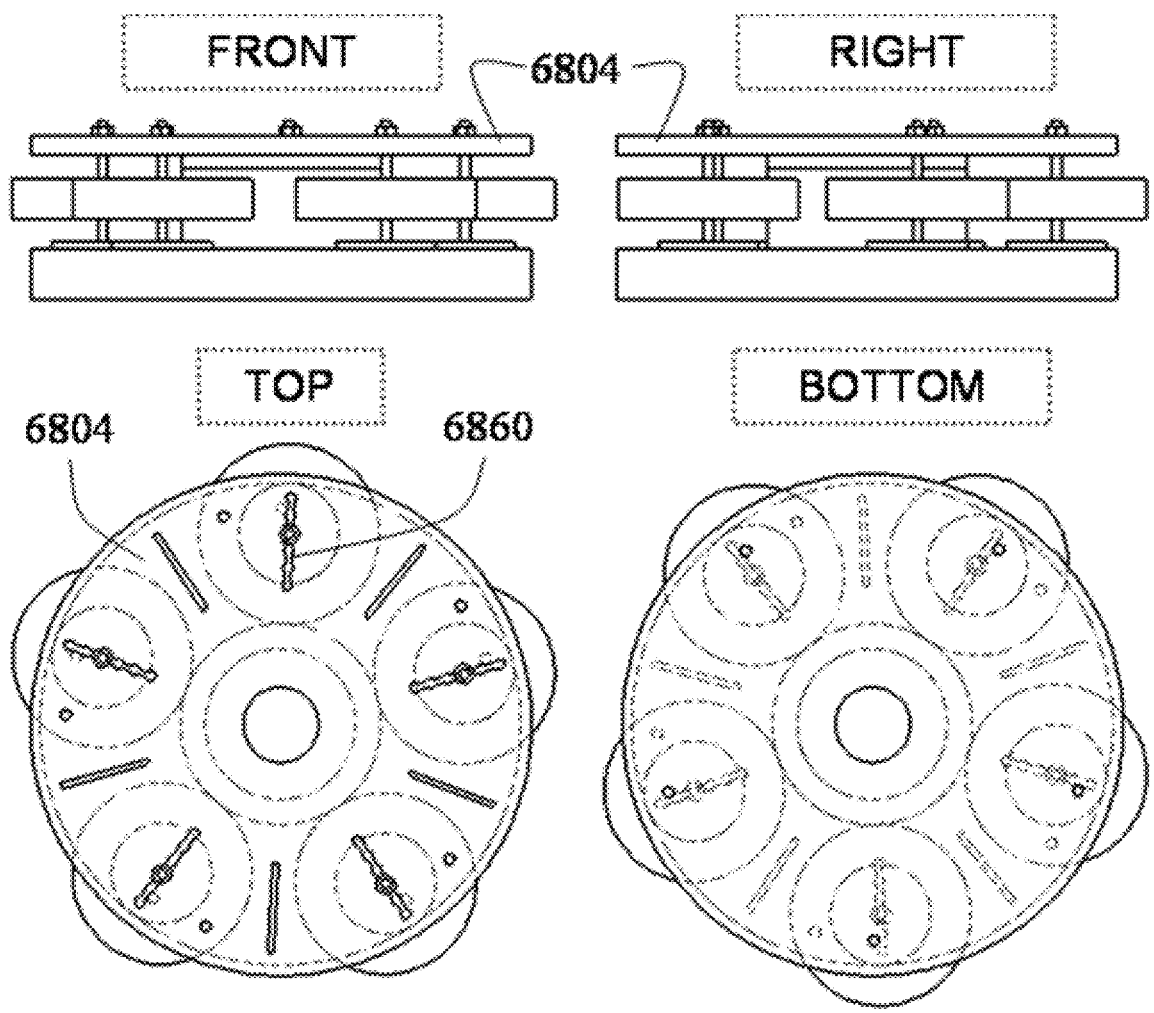
Figure 34:
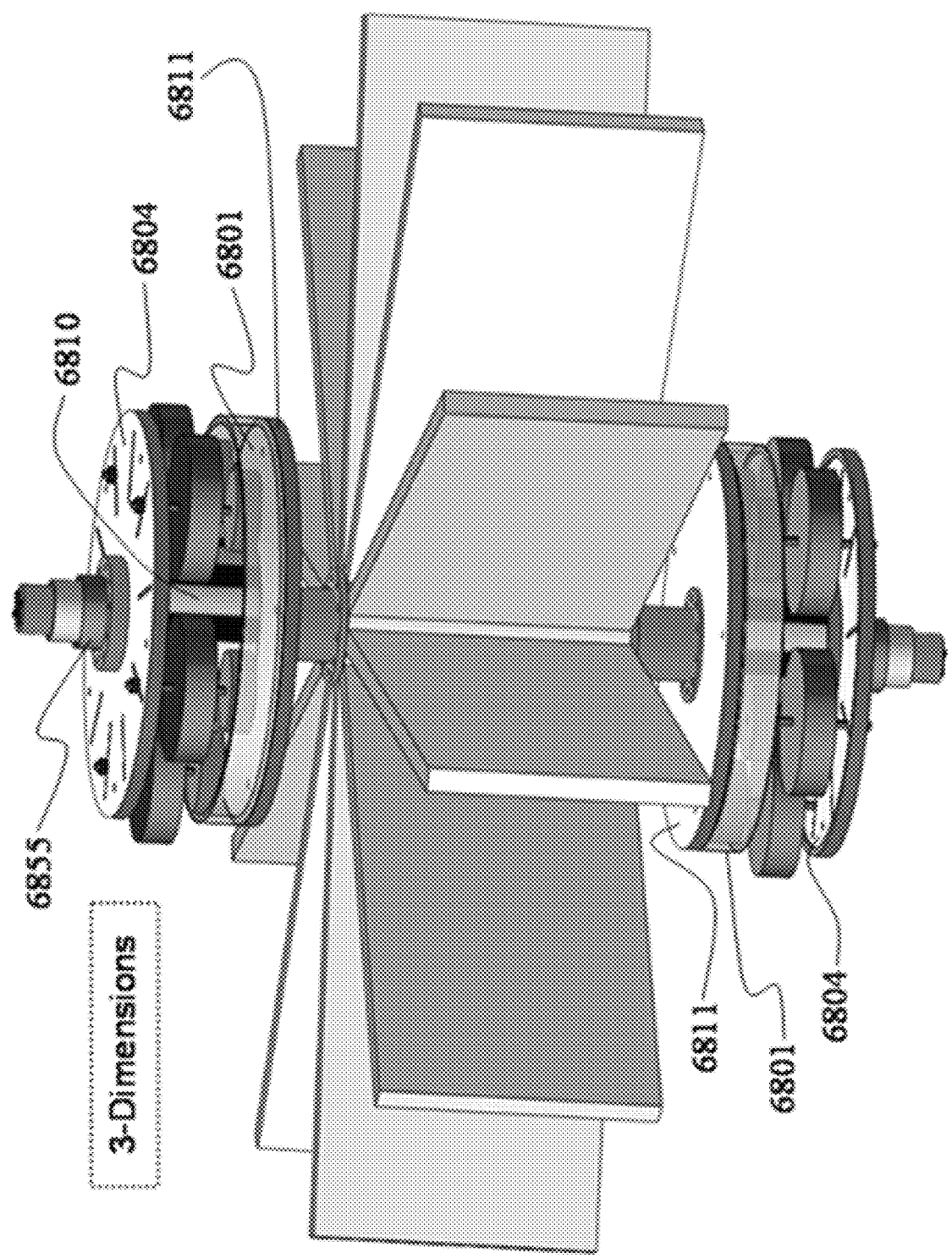
Figure 35:
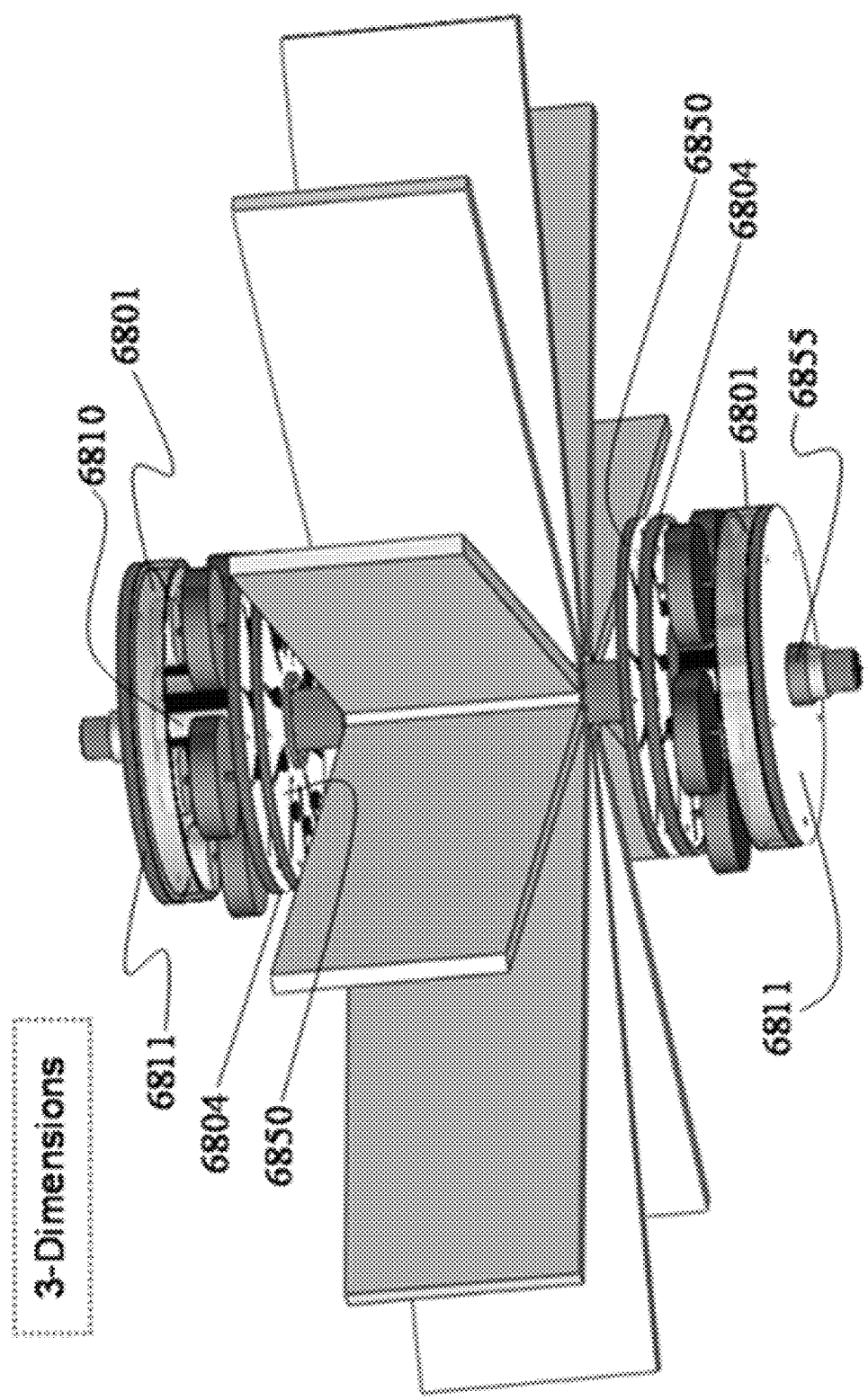
Figure 36:
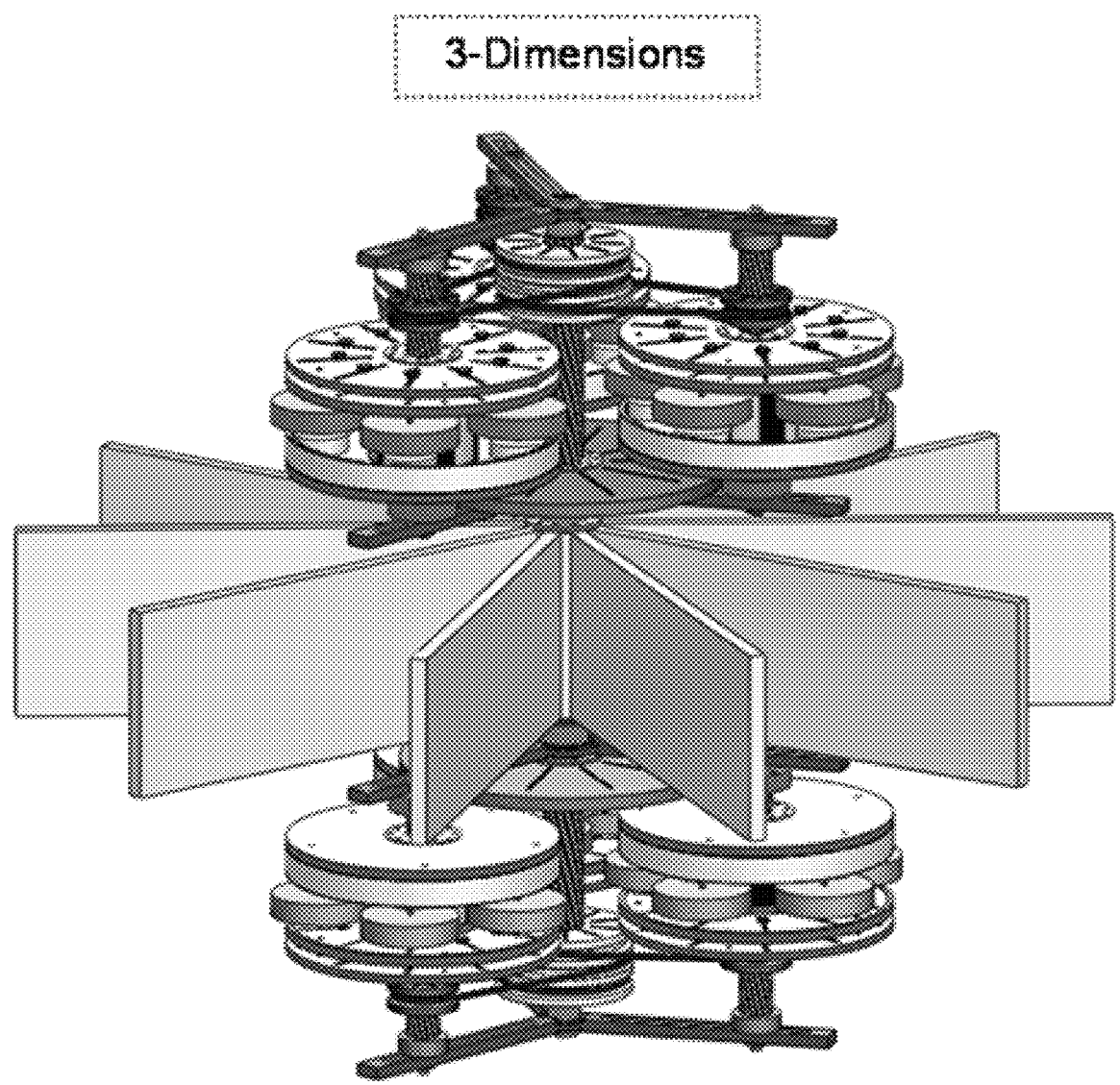

FIG. 24 shows an embodiment using counter-rotating rotor and stator of several generators sets, and an external axle, in perspective view. The generators sets are placed on both turbine rotor and the external axle. Each generator set has a greater relative rotational speed between its rotor and stator compared to the previous generator set;

FIG. 25 shows an embodiment using counter-rotating rotors and stators and several external axles in perspective view, on both sides of a turbine rotors;

FIG. 26 shows an embodiment using counter-rotating rotors and stators and several external axles in right view;

FIG. 27 shows an embodiment using counter-rotating rotors and stators and several external axles in perspective view;

FIG. 28 shows an embodiment using counter-rotating rotors and stators and several external axles in top view;

FIG. 29 shows an embodiment using counter-rotating rotors and stators and several external axles in front view;

FIG. 30 shows an embodiment using counter-rotating rotors and stators and several external axles in back view;

FIG. 31 shows a counter-rotating rotor/stator pairs employing a planetary gear;

FIG. 32 shows elements of the counter-rotating rotor/stator and planetary gear;

FIG. 33 shows the counter-rotating rotor/stator pair using planetary gear, in front, right, top, and bottom views;

FIG. 34 shows the counter-rotating rotor/stator pair using planetary gear employed on a full device, on both sides of a turbine rotor;

FIG. 35 shows the counter-rotating rotor/stator pair using planetary gear employed on a full device, on both sides of a turbine rotor;

FIG. 36 shows an embodiment using multiple provisions of the invention including several external axles and several planetary gears using several counter-rotating stator/rotor pairs, on both sides of a turbine rotor;

In some cases where only the top or bottom of the device is seen, it can be assumed that the other side is of similar or identical construction, such that the device is symmetric around the dividing plane.

DETAILED DESCRIPTION OF THE INVENTION

The present invention will be understood from the following detailed description of preferred embodiments, which are meant to be descriptive and not limiting.

For the sake of brevity, some well-known features, methods, systems, procedures, components, circuits, and so on, are not described in detail.

The term 'wind' as well as the term 'flow' hereinafter refer to any type of fluid flow.

The term 'freewheel' hereinafter refers to a coupling allowing free relative rotation in one direction while maintaining a fixed coupling for the other direction, as in a ratchet and pawl.

The term 'transmission means' hereinafter refers to any means for transfer of torque including but not limited to one or more or groups of wheels, flywheels, gears (with one or more stages), cogwheels, pulleys, belts, bands, cords, ropes, chains, shafts, crankshaft, hydraulic means, rigid means, continuously variable transmissions, planetary gears, thermo-mechanical means, pressure means, steam means, other thermodynamic means, pneumatic means, spring means, chemical means, magnetic means, electric means, and the like, in any desirable direction.

The term 'transmission train' hereinafter refers to a multi-stage transmission such as a gear-train, a set of pulleys connected by belts, bands, cords, ropes, chains, shafts, crankshafts, hydraulic means, rigid means, continuously variable transmissions, planetary gears, wheels, flywheels, cogwheels, or the like, adapted to change the rotational speed of an output wheel relative to an input wheel.

The term 'external axles' hereinafter refers to one or more separate, further axles used in gear trains or to support gear trains, in addition to the primary axle of a motive power source. Thus for example a first or primary axle may rotate the external axle by way of a gear train, and the external axle may rotate at a different speed than the primary axle, or may even be stationary, while gears may rotate upon the external axle, for example on bearings.

The present invention relates to the field of generators and wind energy but can be applied to any type of fluid flow such as liquid flow or otherwise and any kind of turbine.

GENERATOR ROTATION

In this invention we describe "inverse exponential drive", this being rotation of both sections of an electrical generator, such that both rotor and what would otherwise be called 'stator' rotate with respect to a 'stationary' reference frame such as the earth, in opposite directions to each other.

We present a number of innovative methods for multiplying the relative rotational speed between rotor and stator of a generator, to obtain factors of doubling or greater of this relative speed.

The current invention uses two or more gear stages to form a transmission train to achieve arbitrarily high gear ratios, ratios not found in the prior art in connection with energy conversion from fluid flow turbines. Generally, each stage will preferably provide a gear ratio greater than one such that the rotational output speed is greater than the input speed.

This is distinct from the prior art wherein only a single ratio is used, and/or wherein a double ratio is used, but without having the ability to reach or exceed the doubling of the original relative rotational speed. This invention allows for a relative speed of double or more than the original relative rotational speed. However as will be appreciated by one skilled in the art, any multiple of the original relative speed is possible.

The inventive methods can work on any type of turbine or generator, for instance, but not limited to, hydroelectric generators using any types of turbines such as Francis, Kaplan, Pelton, and any others. It is further possible to use these provisions in any other type of generator including those based on heat engines and other power sources.

The generators may comprise one or more magnetic and one or more copper plates. The magnetic and copper plates are used and shown in the figures as examples for stator and rotor or electromagnetic part, but any other energy conversion devices may be used.

The invention can benefit from use of a shroud which covers part of one or more of the turbine rotors swept area, but this is not necessary for its operation.

Section 10A: Transmission Train Means for Two Turbine Rotors

The use of belts, bands, chains, or other transmission means to form a transmission train between two or more turbine rotors (counter and/or co-rotating) is now discussed.

In some embodiments of the invention, transmission means are used to rotate both stator and rotor of one or more generator set(s) in opposite directions, and additionally increase the relative speed between them.

For a pair (or larger number) of counter or co-rotating turbine rotors, one element of the stator-rotor pair of a generator is fixed to one of the turbine rotors and rotates with that turbine rotor, and the corresponding element of the other pair is fixed to another of the turbine rotors and rotates with it.

To create a greater relative speed between rotor and stator of each pair, elements of the sets are coupled.

For example, a rotor that is fixed to a clockwise spinning turbine rotor may be coupled to a stator whose rotor is fixed to an anti-clockwise turbine rotor.

Similarly, a rotor that is spinning anti-clockwise is coupled to a stator whose turbine rotor is spinning clockwise.

Thus each rotor/stator pair is given additional relative speed.

It is possible to use the same idea on two or more co-rotating turbine rotors, by use of a crossed belt or odd number of gears, which would accomplish the same effect of creating relatively speed between rotor and stator of each generator as will be clear to one skilled in the art.

Figure 1:
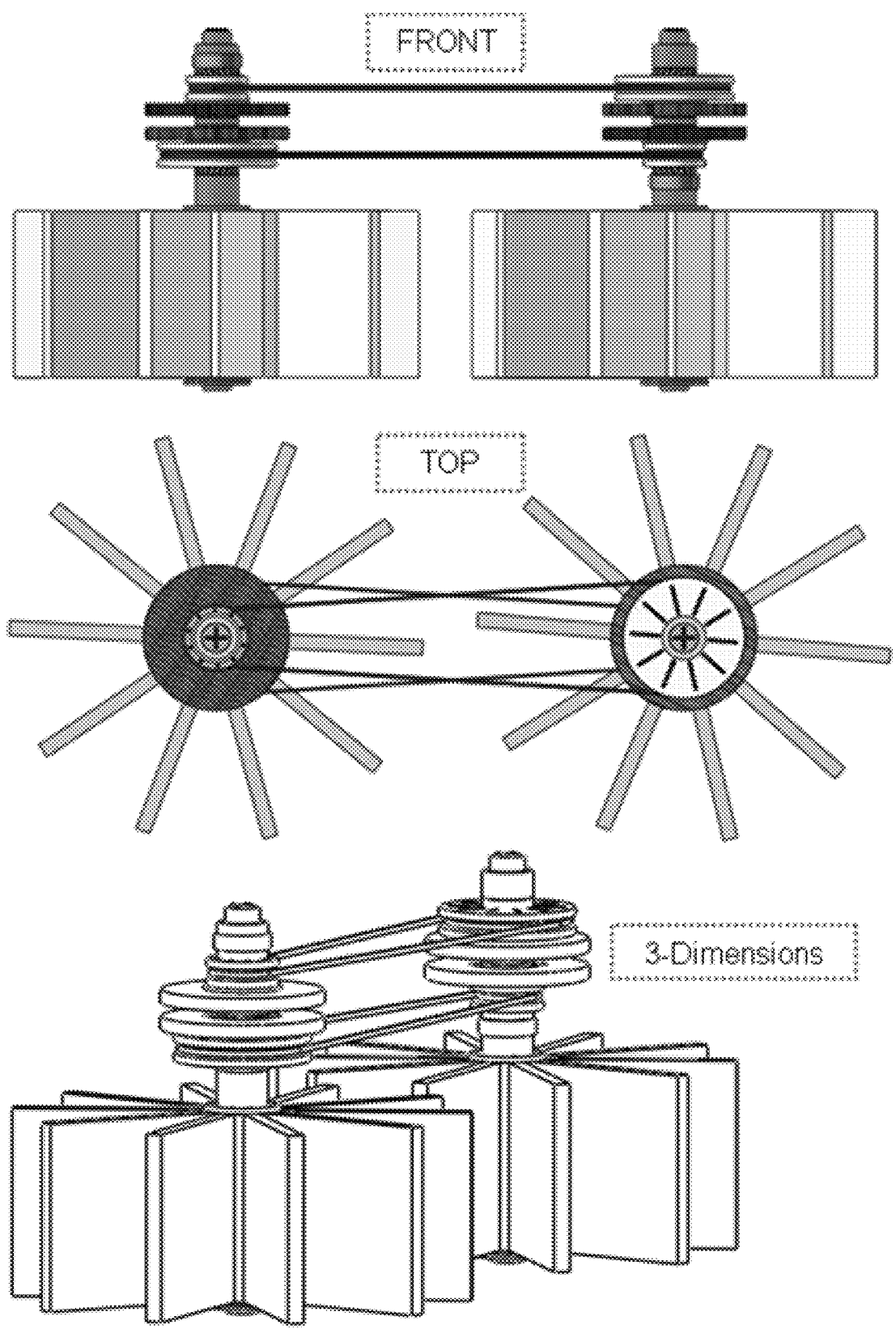
FIG. 1 shows an embodiment of the invention having transmission means for counter-rotating rotors and stators, and two turbine rotors.

An example configuration is shown in FIG. 1, showing two counter rotating turbine rotors, where the rotors and stators of the two different generators on the right and left of the figure, are attached by means of belts to each other.

To give a concrete example, let us say the rotors of each generator are fixed to the turbine rotors. The rotors are connected by means of belts, chains, or the like to the opposite stators.

Since in this example, the turbine rotors are turning in opposite directions, the rotor and stator of each generator spin in opposite directions as well, and hence the relative rotational velocity found between rotor and stator is potentially increased.

The rotation of the left turbine rotor is imparted to the right stator, and the rotation of the right turbine rotor is imparted to the left stator.

The relative rotational speed may be controlled by using two-or-more different wheel sizes in each gear stage.

This fixes an efficient gear ratio having a high extended range since it is effectively equivalent to a two-or-more stage gear.

Each stage can multiply the speed of the output as compared to the input.

As will be apparent to the reader this will allow for an arbitrarily large increase of the relative rotational speed in both generators since the stator of each of the generators is now spinning at a ratio fixed by a two-stage gear instead of a one-stage gear.

If the gear ratio of the transmission in each stage is chosen such that the relative speed is increased, this will be found beneficial as it is known that electrical generators are more efficient (e.g. in terms of power per mass) at higher rotational speeds.

In one embodiment, each turbine rotor is provided with one magnetic plate (presented a rotor of any generator) adjacent to one copper stator plate (presented a stator of any generator).

Figure 2:
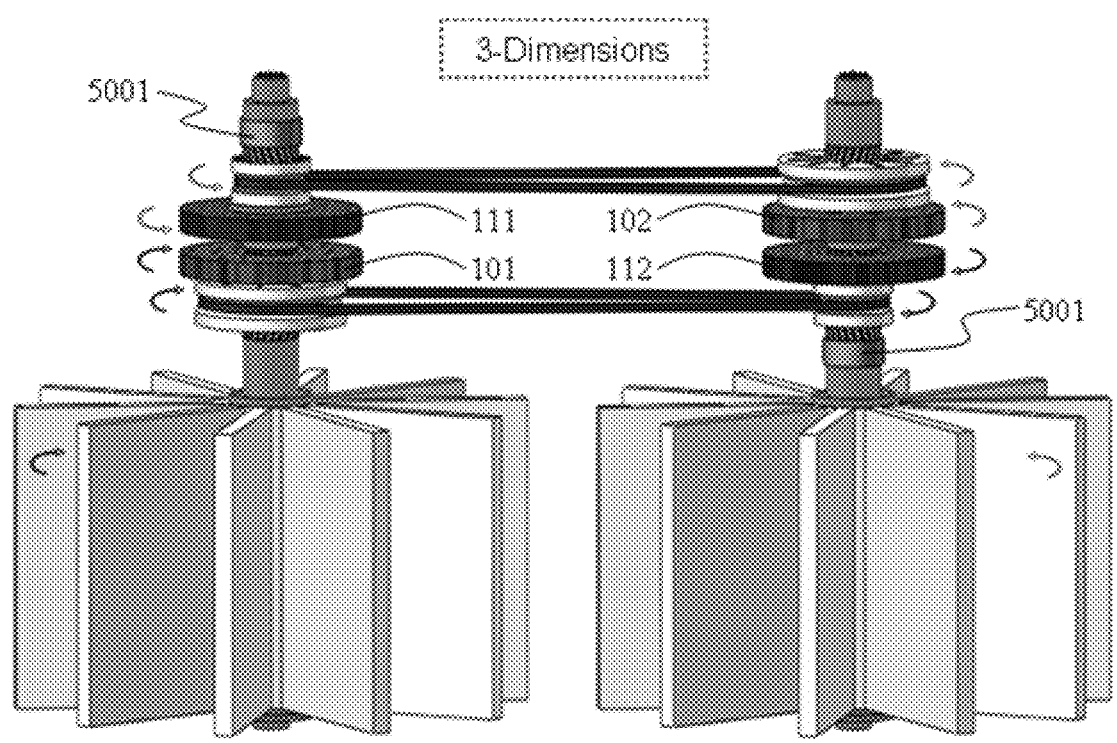
FIG. 2 shows the same embodiment of the invention having counter-rotating rotors and stators, and two turbine rotors.

In FIG. 2 such a configuration is shown. In the exemplary embodiment, the same two counter rotating turbine rotors are shown. A magnetic plate {101} will be connected directly to the turbine rotor and rotate with its rotation.

The magnetic plate {101} is connected by a belt, band, chain, or other transmission means to a copper plate {112} located on the opposing turbine rotor, capable of free rotation relative to the opposing turbine rotor.

The copper plate {111} sits around the axle of the turbine rotor, and can freely spin relative to the turbine rotor.

The copper plate {111} is connected by means of belt, chain, or other transmission means to the magnetic plate {102} located on the opposed turbine rotor, which rotates in the direction of the opposed turbine rotor.

The rotation of the turbine rotor in any direction will cause rotation of the magnetic plate {101} in the same direction, and the rotation of the opposed turbine rotor will cause rotation of the copper plate {111} in the same direction as the opposed turbine rotor.

Since in this case the two turbine rotors are counter rotating to each other, the rotation direction of the copper plate {111} will be in the opposite direction than that of the magnetic plate {101}.

The same effects will be observed in the other generator set (rotor {102} and stator {112}).

As will be clear to one skilled in the art the opposite connections are also possible; that is to say, the copper plate(s) can be attached directly to the turbine rotor(s) and will turn in its direction while the magnetic plate(s) will be attached by means of any suitable transmission means thereto to cause opposing rotations in the generator(s) pairs.

It is further possible that a set of magnets fixed to the turbine rotor will attach to another set of magnets freely spinning on the opposing turbine rotor, and in any other possible combination.

Electrical energy can be derived from the spinning stator or rotor for example by means of slip rings, SlimRotors, swivels, or any other suitable means allowing one to transfer tension while rotating, including wireless transfer.

Several advantages can be realized by the provisions being described.

Firstly, without using different sized wheels, gears, or transmission means, the relative speed between rotor and stator is already approximately doubled.

By using suitable ratios of gear sizes, wheel size (as shown in the figures) or other transmission ratios, it is possible to multiply the relative speed arbitrarily.

By suitably arranging the ratios, then it is possible to reach very high relative rotational speeds and ratios.

Usually, in order to increase the multiple relative speed of rotation observed between rotor and stator by some multiple of the turbine rotor rotation speed, a large radius wheel/gear wheel should drive a small radius wheel/gear wheel.

In FIGS. 1-8 for example such arrangements have been depicted.

Figure 3:
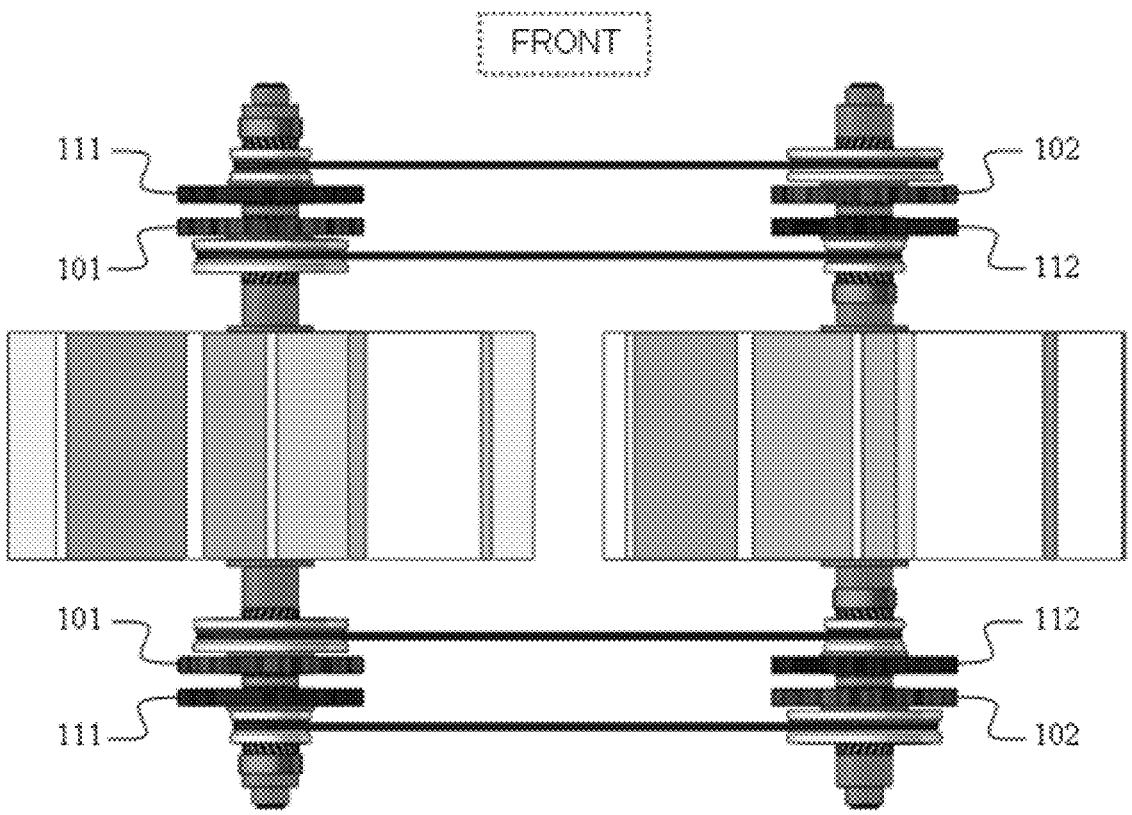
FIG. 3 shows another embodiment of the invention having counter-rotating rotors and stators, on both sides of two turbine rotors.

FIG. 3 shows another embodiment of the invention having counter-rotating rotors and stators, on both sides of two turbine rotors.

Figure 4:
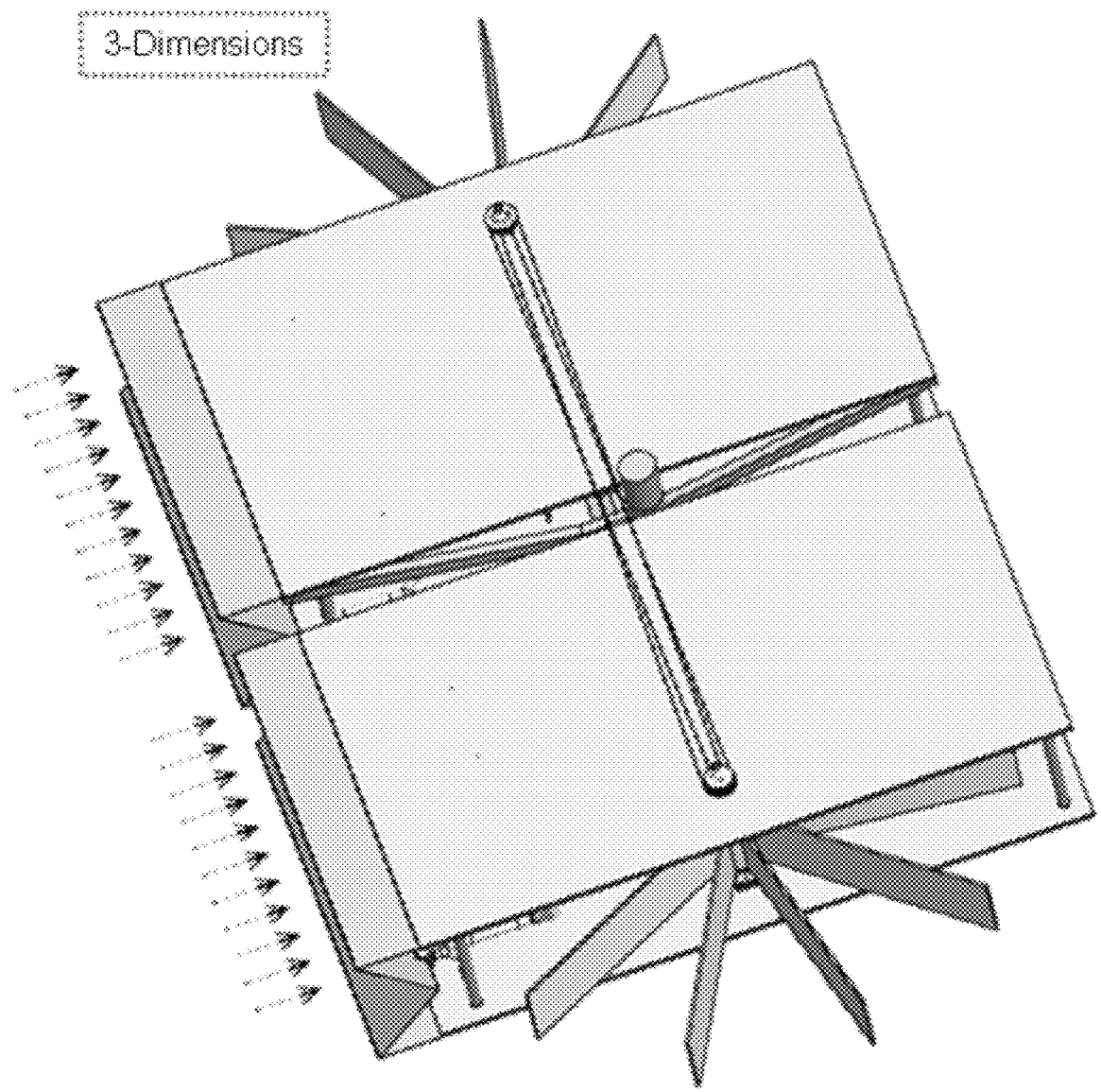
FIG. 4 shows another embodiment of the invention having counter-rotating rotors and stators, including a shroud, and two turbine rotors.

FIG. 4 shows another embodiment of the invention having counter-rotating rotors and stators, including a shroud, and two turbine rotors adapted to rotate in opposite directions.

The rotor is driven by one turbine and the stator by the other, with intervening gear trains adapted to increase the relative rotational speed even further.

This figure shows a shroud used to direct flow away from a turbine's rotors blades as they turn against (into) the flow.

Such shrouds can be used for preventing external direct flow from reaching certain elements, and/or otherwise shaping flow to desirable configurations.

For example, in many vertical axis wind devices, about half the volume of the turbine rotor is shielded by means of a shroud (or cover, shield, leading edge, or the like), such that the returning half of the turbine rotor revolution is kept from contact with direct incoming external flow.

The device may or may not be designed to turn the front side of the shroud against the incoming flow by using any means possible, such as a tail or more, rotating base, mechanically, physically, electronically, automatically and otherwise.

The shroud generally will remain fixed relative to the turbine rotors and other components, making implementation easier.

However the shroud may also be movable with respect to the other components.

Furthermore the inside of the shroud allows for a degree of isolation from the surroundings.

The shroud, turbine rotor, and blades may be made of any suitable material, for example, metal, concrete, wood, plastic, carbon, fiberglass, canvas, rubber, nylon, sail material, composite material, and combinations thereof.

Figure 5:
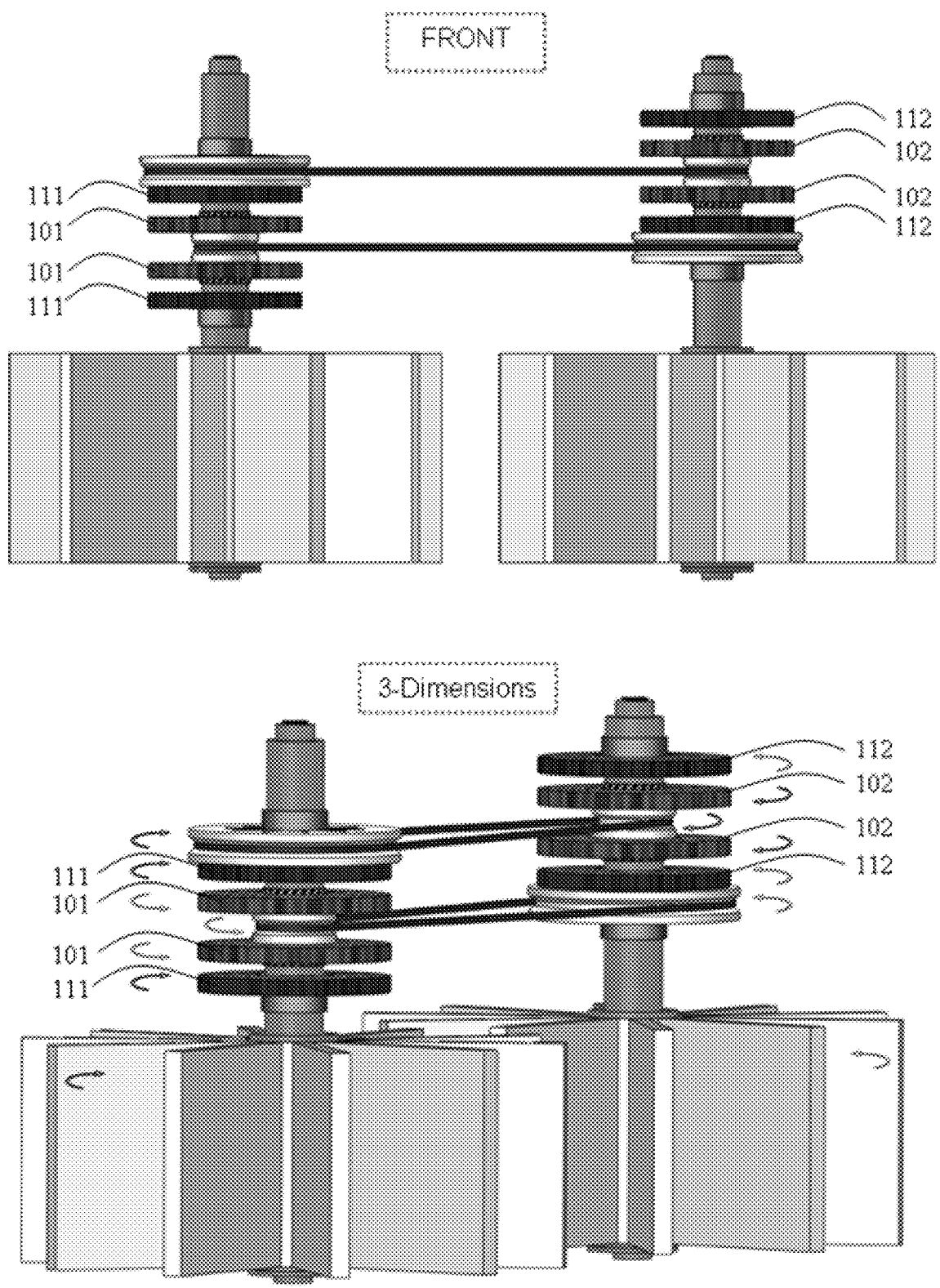
FIG. 5 shows an embodiment of the invention having counter-rotating rotors and stators using straight belts and double generators, and two turbine rotors.
Figure 6:
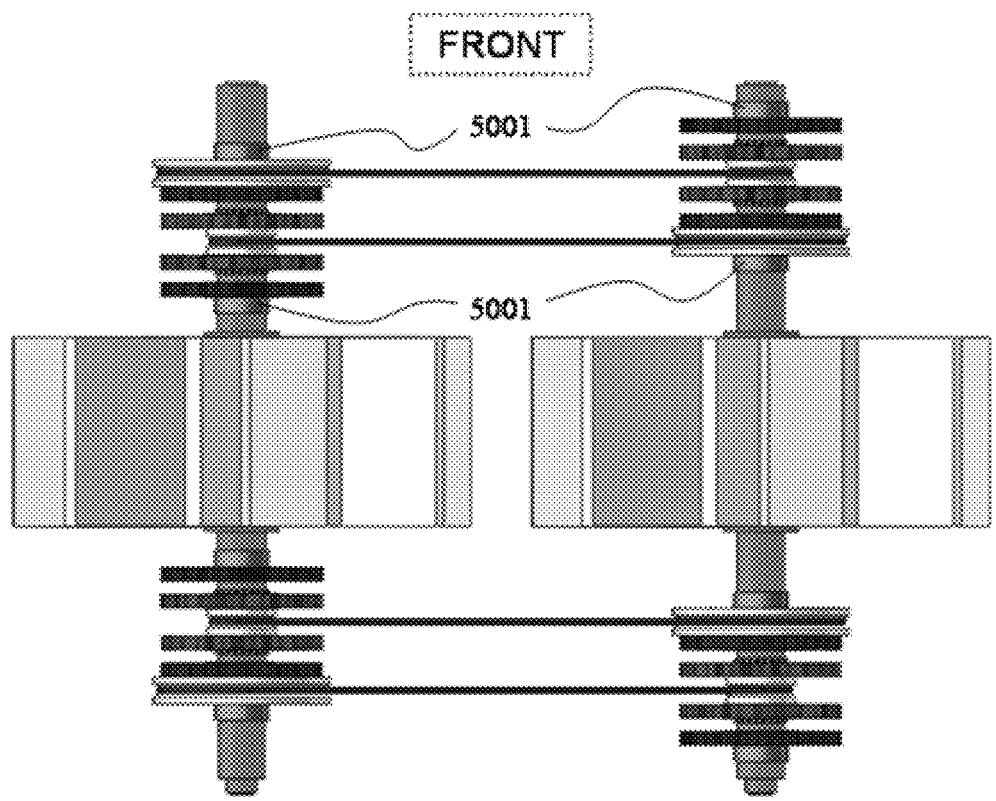
FIG. 6 shows an embodiment of the invention having counter-rotating rotors and stators using straight belts and double generators, on both sides of two turbine rotors.
Figure 7:
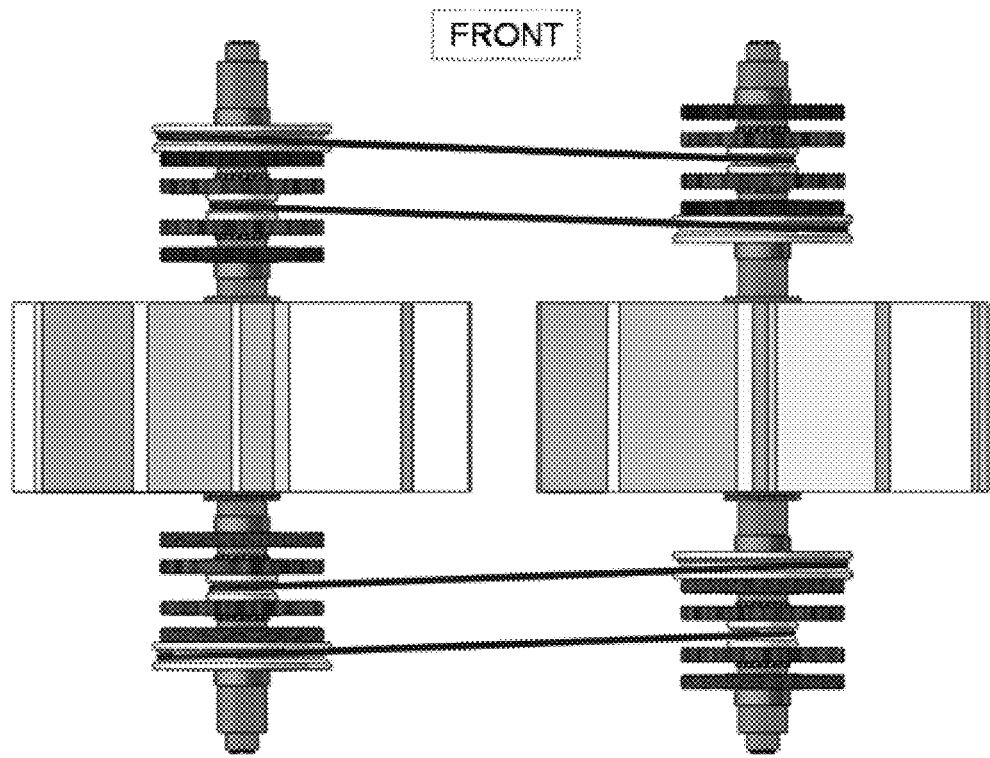
FIG. 7 shows an embodiment of the invention having counter-rotating rotors and stators using offset belts and double generators, on both sides of two turbine rotors.

Embodiments using doubled plates are shown in FIGS. 5-7.

In FIG. 5, two copper plates {111} can be connected directly to a turbine rotor such that they spin with it.

One of the copper plates is connected by transmission means, preferably having a relatively large wheel/gear wheel radius, to a double magnetic plate {102} placed on the opposed turbine rotor, preferably having a relatively small wheel/gear wheel radius, which said double magnetic plate {102} may rotate freely with respect thereto.

On the opposed counter rotating turbine, two copper plates {112} can be connected directly to that opposed turbine rotor such that they spin with it.

One of the copper plates is connected by transmission means, preferably having a relatively large wheel/gear wheel radius, to a double magnetic plate {101} placed on the first turbine rotor, preferably having a relatively small wheel/gear wheel radius, which said double magnetic plate {101} may rotate freely with respect thereto.

As described above, rotation of the turbines rotors will cause rotation of the rotors in one direction and their stators in the opposite direction, resulting in both generators a greater relative rotational speed than that of a conventional generator attached to a standard fluid flow turbine rotor.

FIG. 6 shows an embodiment of the invention having counter-rotating rotors and stators using straight belts and double generators, on both sides of two turbine rotors.

The elements 5001 denote swivels or any other means for transferring tension during rotation including wireless transfer, and can be located on any suitable structure.

FIG. 7 shows another embodiment of the invention having counter-rotating rotors and stators using offset belts and double generators, on both sides of two turbine rotors.

Figure 8:
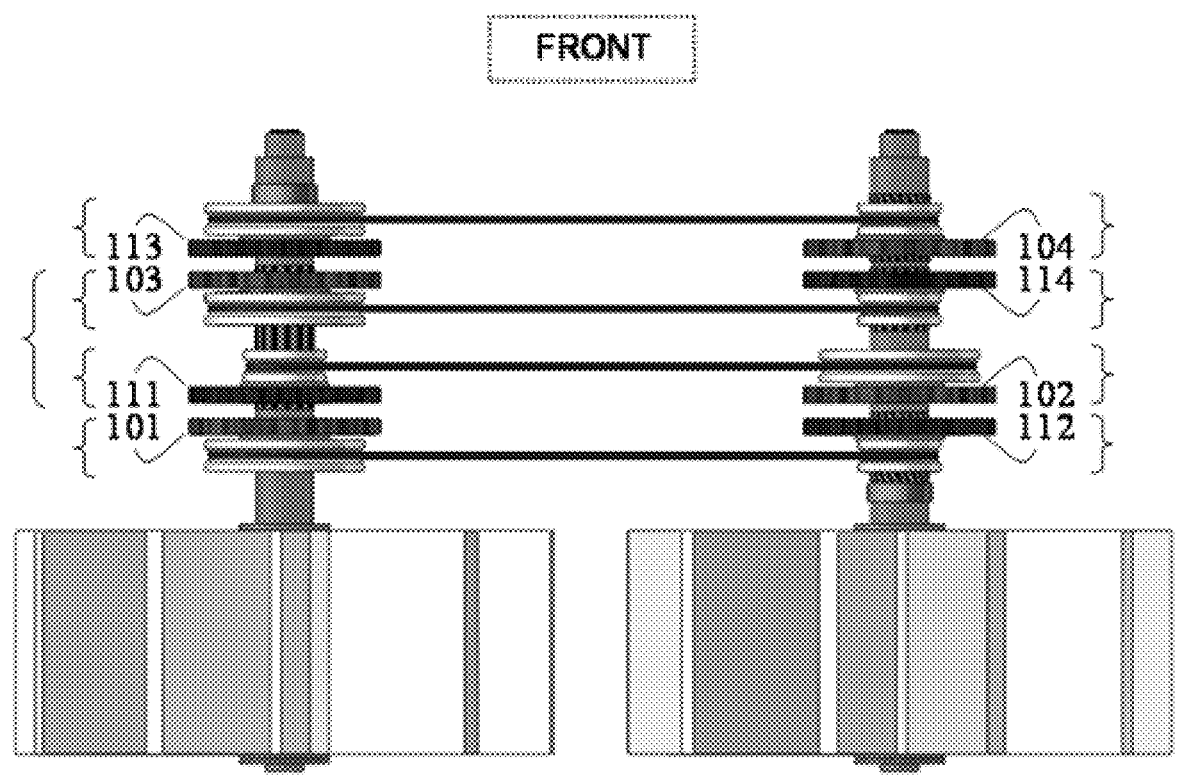
FIG. 8 shows another embodiment of the invention having counter-rotating rotors and stators using straight belts, four generators, and two turbine rotors.

FIG. 8 shows another embodiment of the invention having counter-rotating rotors and stators, using straight belts, four generators, on two counter rotating turbine rotors.

In this figure, which demonstrates how a high relative rotational speed between rotor and stator may be achieved, a rotor {101} of a generator can be connected directly to a turbine rotor such that it spins with it.

The rotor {101} is connected by transmission means, preferably having a relatively large wheel/gear wheel radius, to a stator {112}, placed on the opposed turbine rotor, preferably having a relatively small wheel/gear wheel radius, which said stator {112} may rotate freely with respect thereto.

On the opposed counter rotating turbine, a rotor {102} can be connected directly to that opposed turbine rotor such that it spins with it.

The rotor {102} is connected by transmission means, preferably having a relatively large wheel/gear wheel radius, to a stator {111} placed on the first turbine rotor, preferably having a relatively small wheel/gear wheel radius, which said stator {111} may rotate freely with respect thereto.

As both turbine rotors spin, the stators {111} and {112} both rotate in an opposite direction to the rotors {101} and {102}, respectively, and also to the opposite direction of their turbine rotor, at a relative speed determined by the product of the gear ratio of each of the first two gear stages involved.

Furthermore, a rotor {103} placed on the turbine rotor and may rotate freely with respect thereto, can be connected to stator {111} and spins with it.

The rotation direction of both rotor {103} and stator {111} is opposite to the turbine rotor direction, and their rotation speed is larger than the input rotational speed of their turbine rotor.

The rotor {103} is connected by transmission means, preferably having a relatively large wheel/gear wheel radius, to a stator {114}, placed on the opposed turbine rotor, preferably having a relatively small wheel/gear wheel radius, which said stator {114} may rotate freely with respect thereto.

A stator {113} can be connected directly to a turbine rotor such that it spins with it.

The stator {113} is connected by transmission means, preferably having a relatively large wheel/gear wheel radius, to a rotor {104}, placed on the opposed turbine rotor, preferably having a relatively small wheel/gear wheel radius, which said rotor {104} may rotate freely with respect thereto.

As a result of this arrangement, the rotors {103} and {104} also spin in an opposite direction with respect to the spin of their stators {113} and {114}, respectively.

Furthermore, the rotor {103} and stator {113} pair spin one against the other at the same relative rotational speed as the rotor and the stator pairs of the first two generators, a speed which is already doubled or more than the relative rotational speed observed between the two turbines rotors.

Furthermore, the rotor {104} and the stator {114} pair has an even larger relative rotational speed between them, compared to the other rotor/stator pairs.

Other arrangements are also possible, such as but not limited to, using a different number of generator sets, of the same and/or different types, different numbers of gear stages, different arrangements of the wheels/flywheels and/or the generators, and otherwise, all of which are within the provision of the invention.

As will be known to one skilled in the art increased rotational speed allows for more efficient operation and/or smaller, cheaper devices using fewer magnets and/or less copper or conductive material.

We note several points in connection with these provisions, which are valid also for all following parts of the invention:

A). Elements 5001 (see FIG. 2 and FIG. 6 for example) denote swivels or any other means for transferring tension during rotation including wireless transfer, and can be located on any suitable structure.

B). The arrangement of magnetic and copper plates described can also be reversed.

C). It is possible to use any type of energy conversion device such as but not limited to generator or alternator, copper and magnetic plates, electromagnets, or the like.

D). It is possible to use generator types having one rotor with multiple stators, or one stator with multiple rotors, with both stators and rotors rotating in opposite directions.

E). It is possible to use more energy conversion devices as allowed by the available space and available torque from the turbine rotor.

F). It is possible to use a number of wheels, gearwheels, or cogwheels, or the like, in any individual size, and with any individual number of teeth.

G). It is possible to use one or more chains, bands or belts, or the like, in straight and/or crossed combinations.

H). The magnet or stator itself can take the place of the gears or gearwheels in the figures, and/or take the role of flywheels, and the transmission means can be directly connected thereto.

I). It is possible to add gears to the system, on or in place of the wheels and/or the flywheels. The invention may use a compound gear such as that in an 18-speed bicycle, so that one, two, or more gear multiplications are involved. Any other type of gear mechanism can be utilized such as those in the continuously variable transmission (CVT) of certain cars, or the like.

J). The flywheels can take any shape and form, for instance hollow and/or with two three or more arms, such as wagon wheels or spokes of bicycle wheels, in order to save weight and also to allow for lower flow resistance.

K). It is possible to cause the wheels to themselves serve as turbine blades such that they also contribute to the energy production of the device.

L). It is possible to use many inverse energy conversion devices and/or many gear stages inside the inverse energy conversion devices, for example on top of each other. Each of these can have gear ratios greater than one. They are thus able to reach arbitrary relative speed, insofar as allowed by available space and power and material. Several examples demonstrating this concept are shown, such as in FIG. 8. Each such stage that is added multiplies and thus increases the input speed from the previous stages.

M). It is possible to install any of such provisions on one or two sides of the turbine rotors as shown for example in an exemplary embodiment in FIG. 3.

N). It is possible to add external axles, as many as desired.

The transmission means described in all of the invention may comprise multiple stages able to reach extremely high gear ratios between rotor(s) and stator(s).

The generators and plates shown in the figures are shown connected to the turbine rotors and the belts or bands or chains are tightened between them. However it is equally possible to put the generators on an external axle and to tighten them on the external axles.

With the help of an external axle such as this, it is possible to place the device at any point between the two turbines rotors include exactly in the middle between them in order to save weight on the axles of the turbines rotors.

Section 10B: Use of One or More External Axles for One or More Turbine Rotors

In some embodiments of the invention, one or more external axles are used to rotate both stator and rotor of one or more generators sets in opposite directions, and additionally increases the relative speed between them.

For the case of using an external axle, one or more, and a single turbine rotor or more, there are several possibilities. The external axle is connected to any possible element of the device, including for example the hub of the turbine rotor, the shroud (if being used), the tower, or any other location.

A). A single generator whose rotor spins counter to its stator, located on the turbine rotor, being spun by means of a belt, band, chain, wheels, gear wheels, flywheels, or other transmission means connected to one external axle only.

B). A number of generators having rotors and counter-rotating stators located on the turbine rotor, being spun by means of a belt, band, chain, wheels, gear wheels, flywheels, or other transmission means connected to one external axle only.

C). A single generator, or more, having a rotor(s) and counter-rotating stator(s) located on a single external axle, being spun by means of a belt, band, chain, wheels, gear wheels, flywheels, or other transmission means connected to the turbine rotor.

D). A number of generators having counter-rotating rotors and stators, located on a number of external axles, being spun by means of a belt, band, chain, wheels, gear wheels, flywheels, or other transmission means connected to the turbine rotor.

E). A number of generators having counter-rotating rotors and stators, located on the turbine rotor, being spun by means of a belt, band, chain, wheels, gear wheels, flywheels, or other transmission means connected to a number of external axles.

It is within provision of the invention to provide means for changing the distance between any given external axle and the turbine rotor, for example by using a rail or any other method, in order to allow for changing the size of gears/wheels being employed.

Section 10B-A

Figure 9:
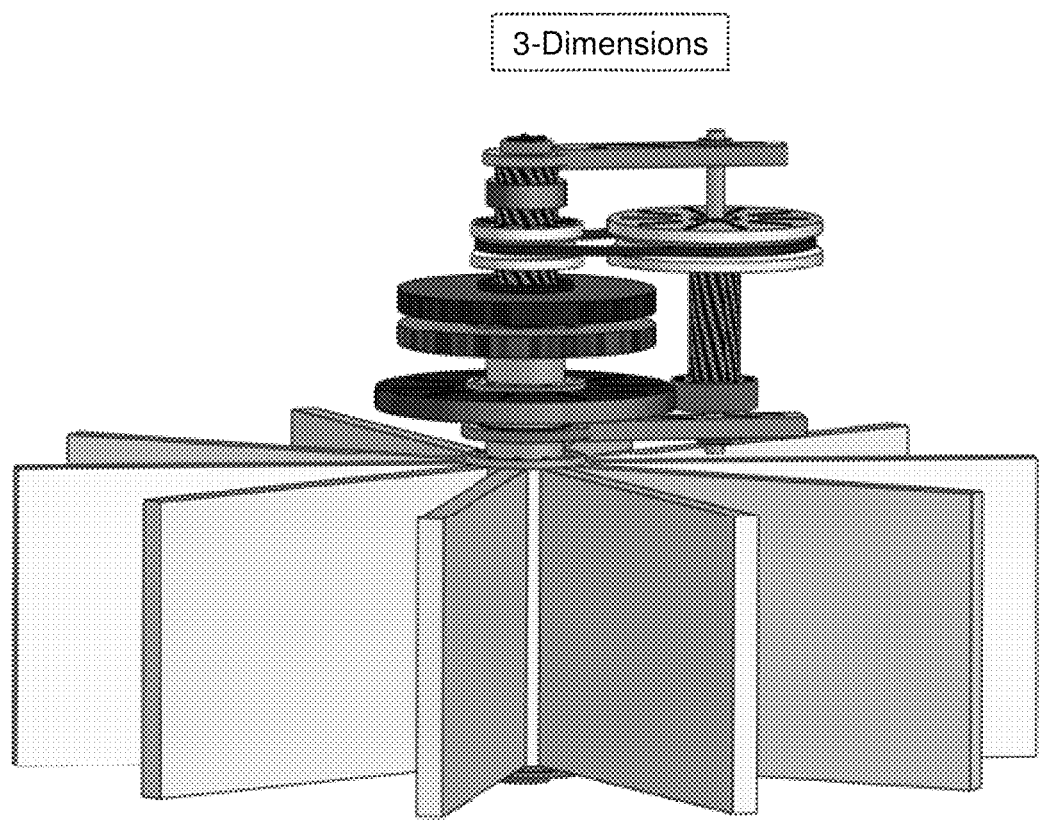
FIG. 9 shows an embodiment of the invention having counter-rotating rotors and stators using an external axle.

Speed doubling and more of a rotor-stator pair can also be achieved with a single turbine rotor and a single external axle as shown in FIG. 9. A single generator placed on the turbine rotor is used. The stator spins in a direction opposite that of the rotor by means of belt, band, chain, wheels, flywheels, gearwheels, or other transmission means connected to a single external axle 522 as shown in FIGS. 9, 10, 11, 12. The turbine rotor (power input rotor) 520 rotatably supported by a primary axle 521.

As the turbine rotor spins, a number of elements spin with it, in the same direction and in the same angular velocity, as they are rigidly attached to it, on the same axle, as the wheel 531 (FIG. 10) and the magnetic plate 532.

This may be a plate of magnetic material or a plate bearing a set of discrete magnets, or electromagnets or a rotor of a generator.

During operation of the device the following will occur:

A). Rotation of the wheel 531 preferably having a relatively larger radius, which will spin wheel 533 which is preferably of small relative radius and is in physical contact with wheel 531 and thus turned by it in the opposite direction. The elements 531 and 533 may also be any type of gear wheel or cogwheel or the like.

B). Rotation of wheel 533 will turn wheel 534 which turns on the same axle as wheel 533, both 533 and 534 are mechanically coupled to each other and turn in the same direction and with the same angular velocity.

C). Rotation of the wheel 534, which preferably has a relatively large radius, will turn wheel 535 due to the belt, band, chain or other coupling means connecting them. Wheel 535 will turn in the same direction as wheel 534 and 533 since the band connecting 534, 535 is not crossed.

D). Rotation of wheel 535, which is preferably of relatively small radius, will directly turn the copper plate 536 to which it is rigidly fixed, on the same axle.

As a result of this arrangement, the copper plate 536 (which represents the stator of a generator, alternator, electromagnet, a simple copper plate, etc.) will turn in the opposite direction from the magnetic plate 532 (which represents a magnetic plate and/or the rotor of the generator, alternator, electromagnets, etc.) which rotates on the same axle as wheel 531.

Usually, in order to increase the relative speed of rotation observed between rotor and stator, by some multiple of the turbine rotor rotation speed, a large radius wheel/gear wheel should drive a small radius wheel/gear wheel, a rule which has been followed in FIGS. 9, 10, 11, 12. This rule is followed in all embodiments of the invention. One advantage of this arrangement is that by intelligent arrangement of the various diameters, the relative speed obtained between rotor and stator can be more than doubled.

As will be known to one skilled in the art, increased rotational speed allows for more efficient operation and/or smaller, cheaper devices using fewer magnets and/or less copper or conductive material.

Figure 10:
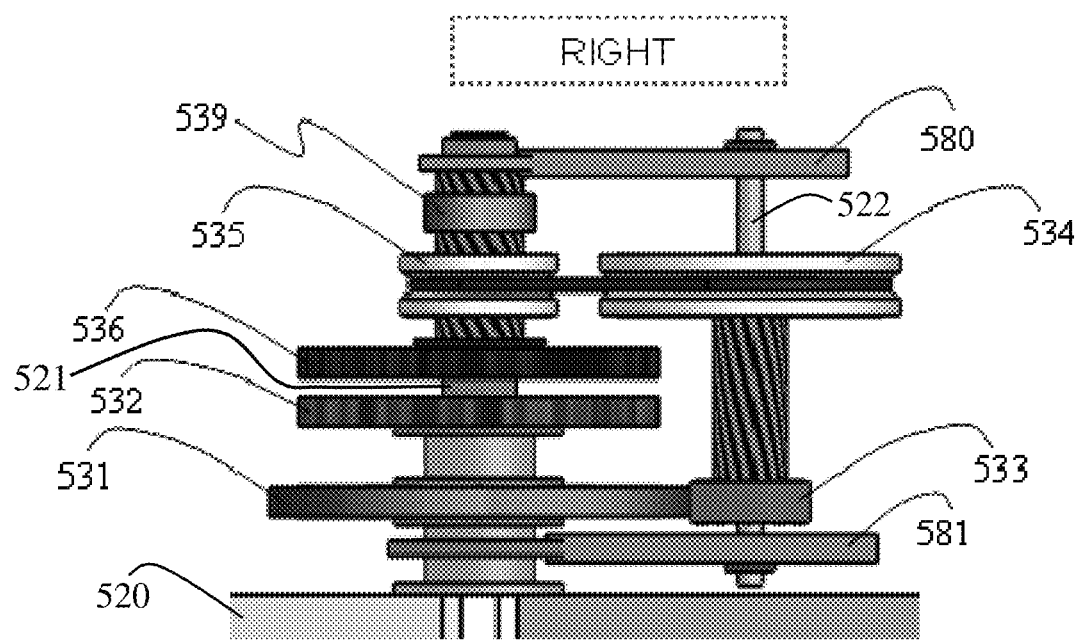
FIG. 10 shows a close-up right view of transmission means for counter-rotating rotors and stators using an external axle.

It is within provision of the invention to provide means for changing the distance between any given external axle and the turbine rotor e.g. using a rail as seen for example in FIG. 10 (elements 580, 581) to allow for changing the size of gears/wheels being employed.

Figure 11:
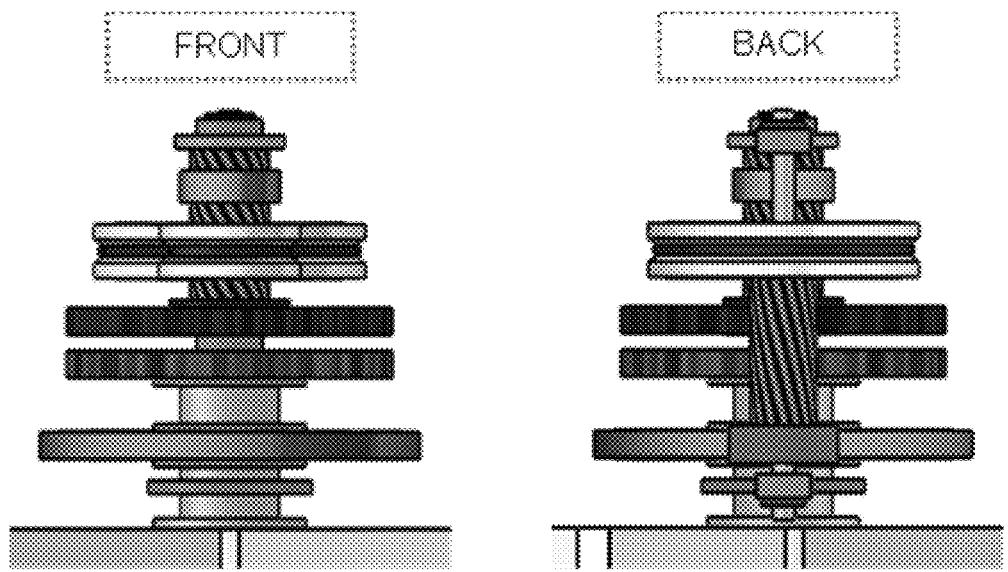
FIG. 11 shows further transmission means suitable for counter-rotating rotors and stators in front and back views using an external axle.

A closer view of the concept from front and back views is shown in FIG. 11.

Figure 12:
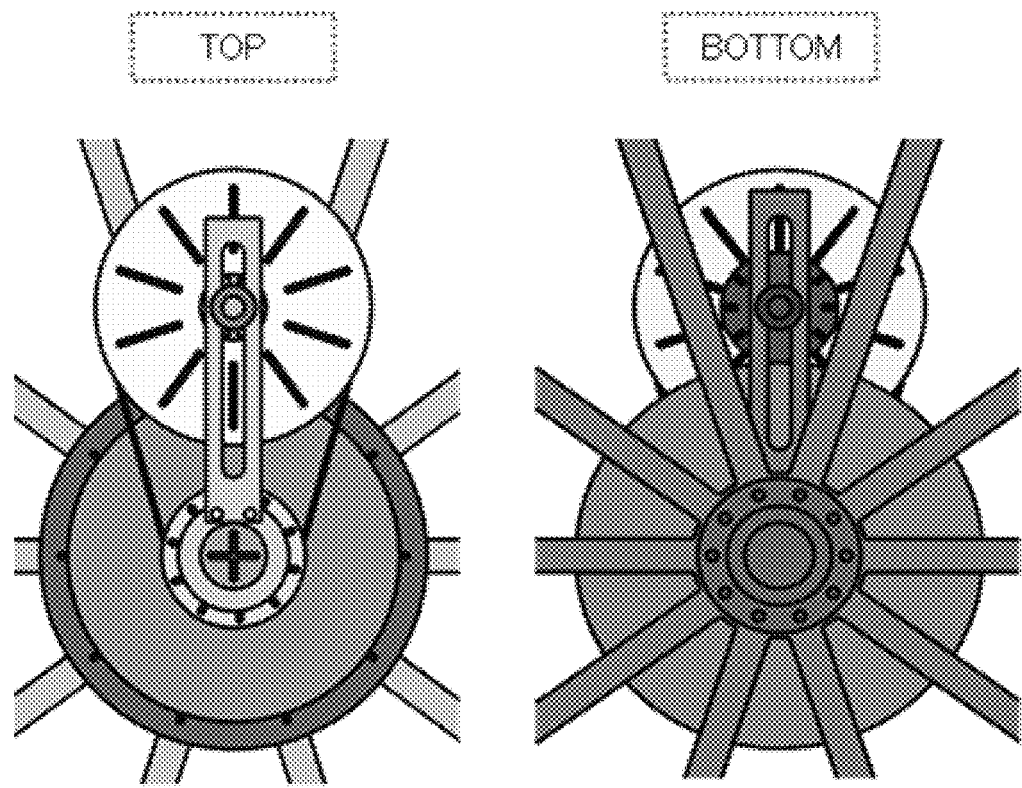
FIG. 12 shows further transmission means suitable for counter-rotating rotors and stators in top and bottom using an external axle.

A closer view of the concept from top and bottom views is shown in FIG. 12.

Figure 13:
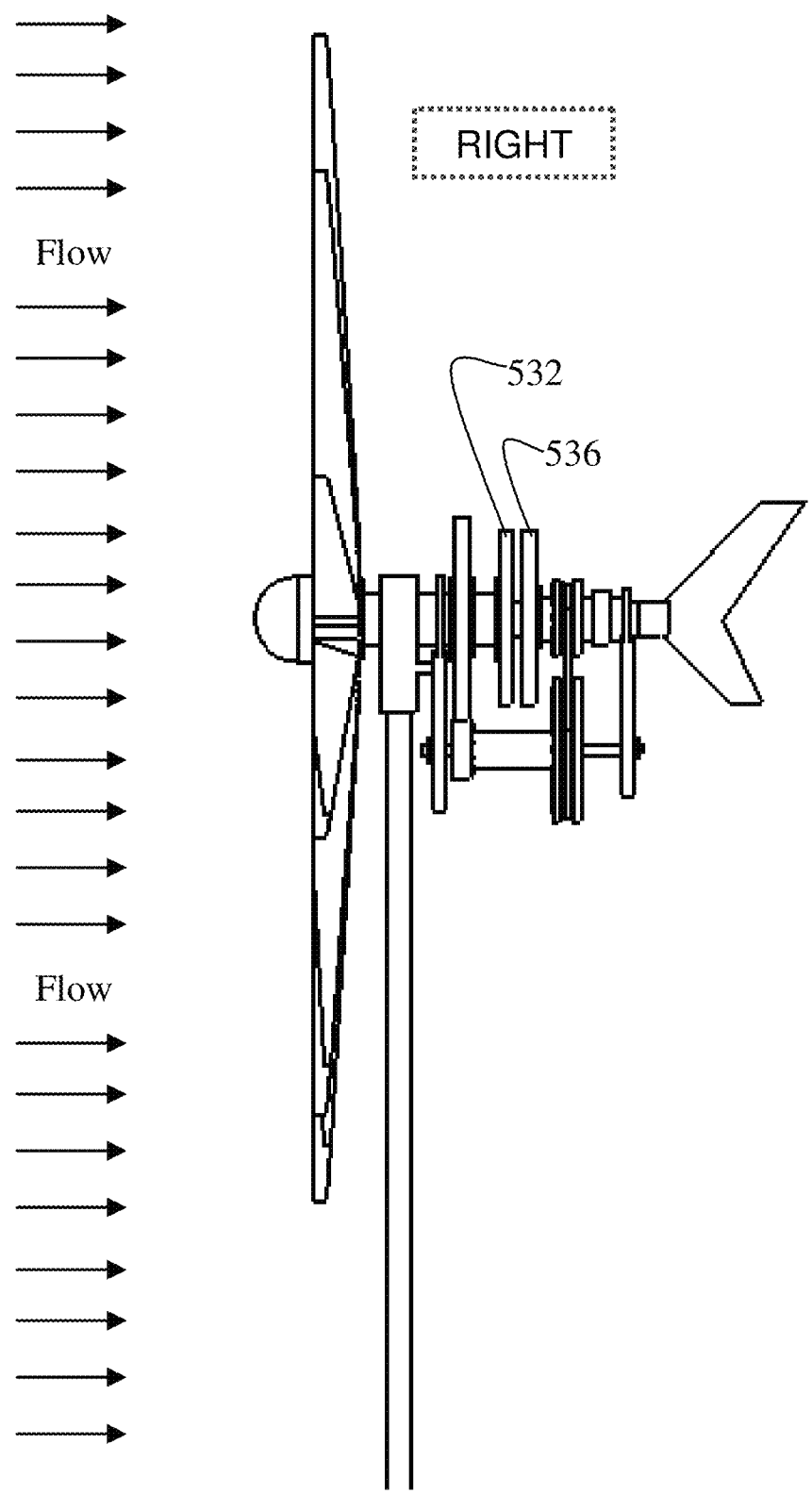
FIGS. 13, 14 show an embodiment using counter-rotating rotors and stators on a horizontal axis turbine using an external axle.

A similar concept is shown in conjunction with a traditional horizontal axis turbine in FIG. 13. In this example the magnetic plate 532 turns with the turbine rotor, and the copper plate 536 turns against the direction of the turbine rotor.

The plates come between the gears or gearwheels of the transmission.

Figure 14:
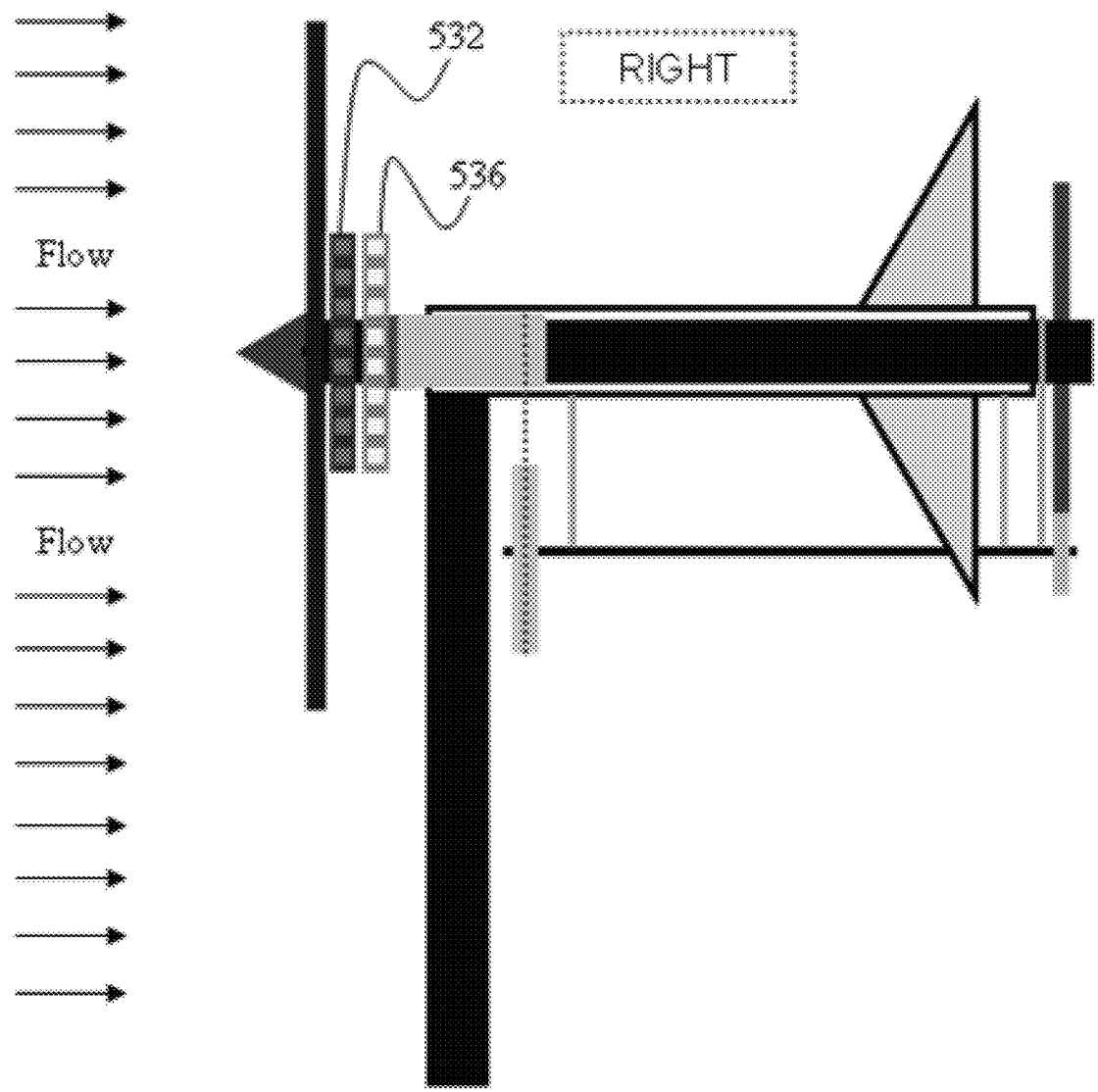

In FIG. 14 an additional example is given where the plates are located before the gears or gearwheels and the transmission. A different location is also possible.

By the same token, the magnetic plate and the copper plate and/or the generator(s) can be placed on an external axle, which will be more fully explored below.

Element 539 (in FIG. 10) is a swivel (or slip ring or the like) adapted to allow the transfer of electric power through a rotating coupling, and can be replaced with any elements allowing one to transfer tension while rotating, including wireless transfer.

It is possible to use a crossed belt, band or chain as well, and/or any other possible opposite transmission means, between the wheels/gear wheels/cogwheels 531,533 (in FIG. 10), which will allow the two axles shown to be set apart from one another.

It is possible to use a gear wheels/cogwheels/wheels, and/or any other transmission means between the wheels 534,535 (in FIG. 10), instead of a belt.

Section 10B-B

Figure 15:
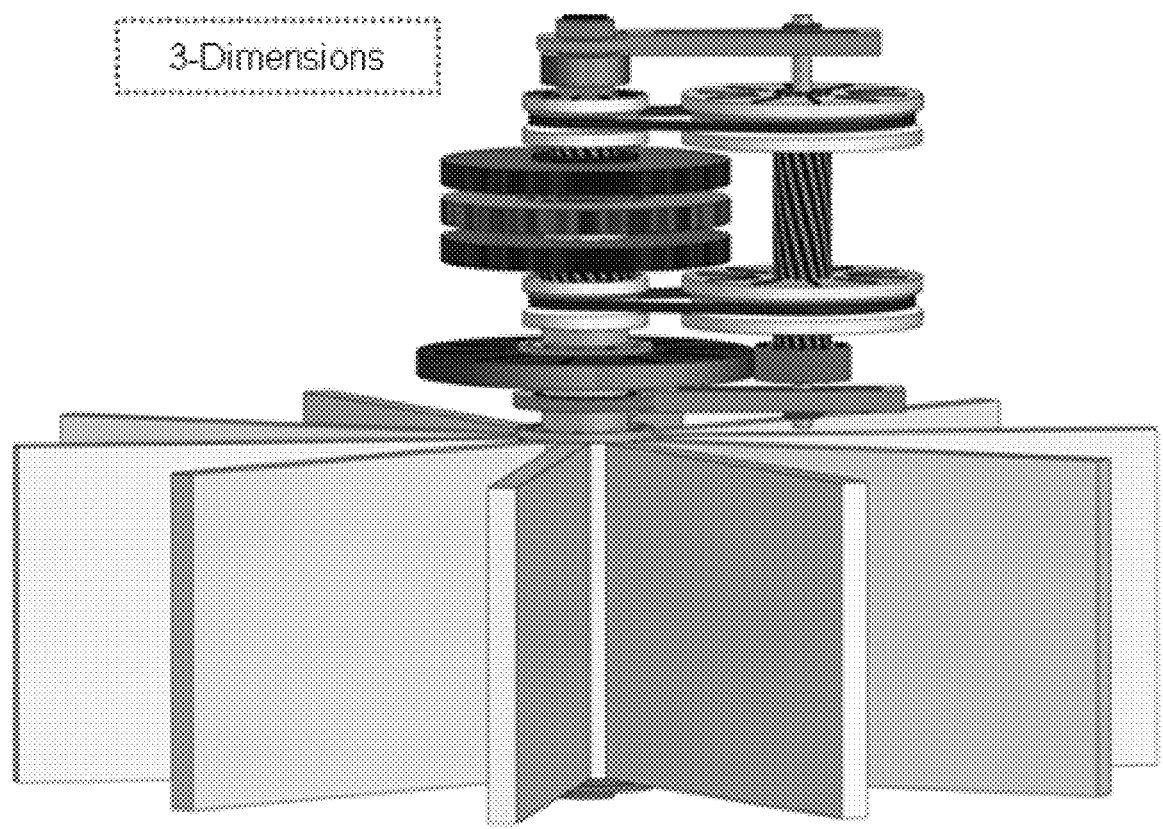
FIG. 15 shows an embodiment using counter-rotating rotors and stators and an external axle.

FIG. 15 presents another embodiment of the invention, using a single external axle.

This allows for a relative rotational velocity of double or greater between one or more rotors and one or more stators, of one or more generators, located on the turbine rotor, being spun by means of belt, band, chain, wheels, gear wheels, flywheels, or other transmission means connected to a single external axle.

Figure 16:
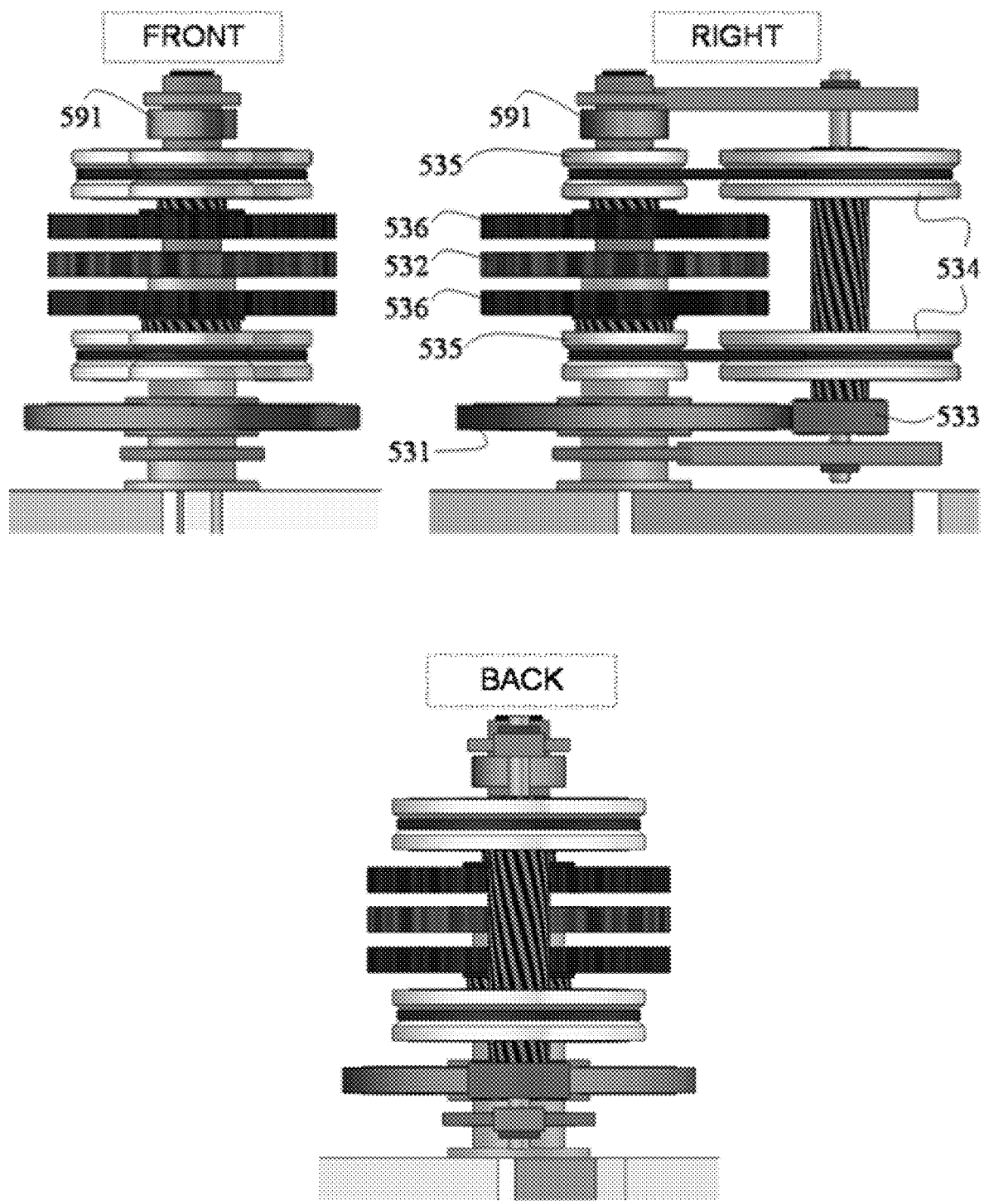
FIG. 16 shows an embodiment using counter-rotating rotors and stators and an external axle in front and right and back view.

A number of generators which have counter-rotating rotors and stators are placed on the turbine rotor as shown in FIGS. 15, 16.

These spin by means of a belt, band, chain, wheels, gear wheels, flywheels, or other transmission means connected to one external axle.

In the figures two copper plates 536 and one rotor 532 are employed but any number may be used, and in different configurations.

The element 591 of FIG. 16 is a swivel and can be replaced with any element allowing one to transfer tension while rotating including wireless transfer.

It is possible to use a crossed belt, band, or chain as well, and/or any other possible opposite transmission means, between the wheels/gear wheels/cogwheels 531,533, which will allow the two axles shown to be set apart from one another.

It is possible to use a gear wheels/cogwheels/wheels and/or any other transmission means between the wheels 534,535 instead of belts.

Figure 17:
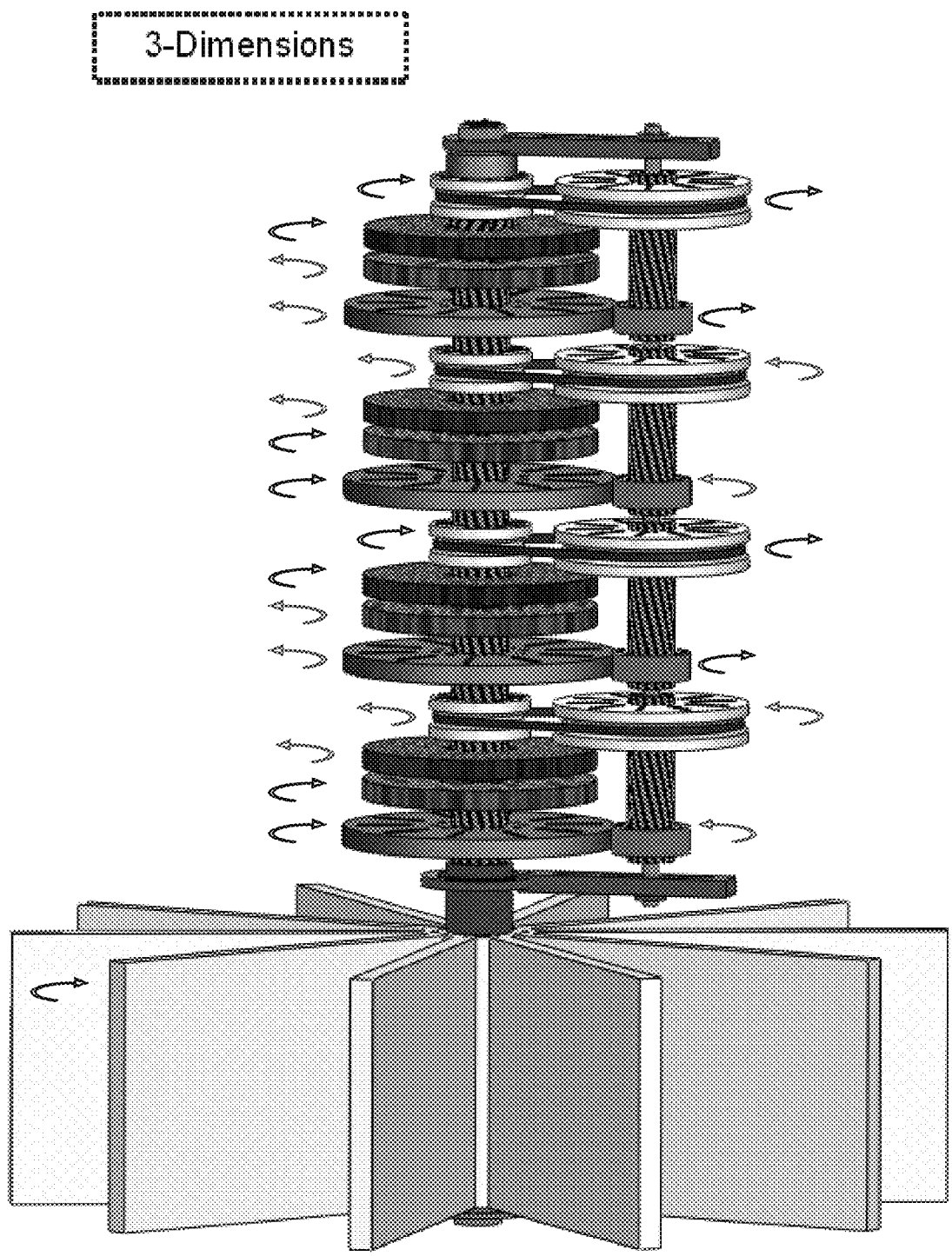
FIGS. 17, 18 show an embodiment using counter-rotating rotors and stators of several generators sets, and an external axle, in perspective and in right views. Each generator set has a greater relative rotational speed between its rotor and stator compared to the previous generator set.
Figure 18:
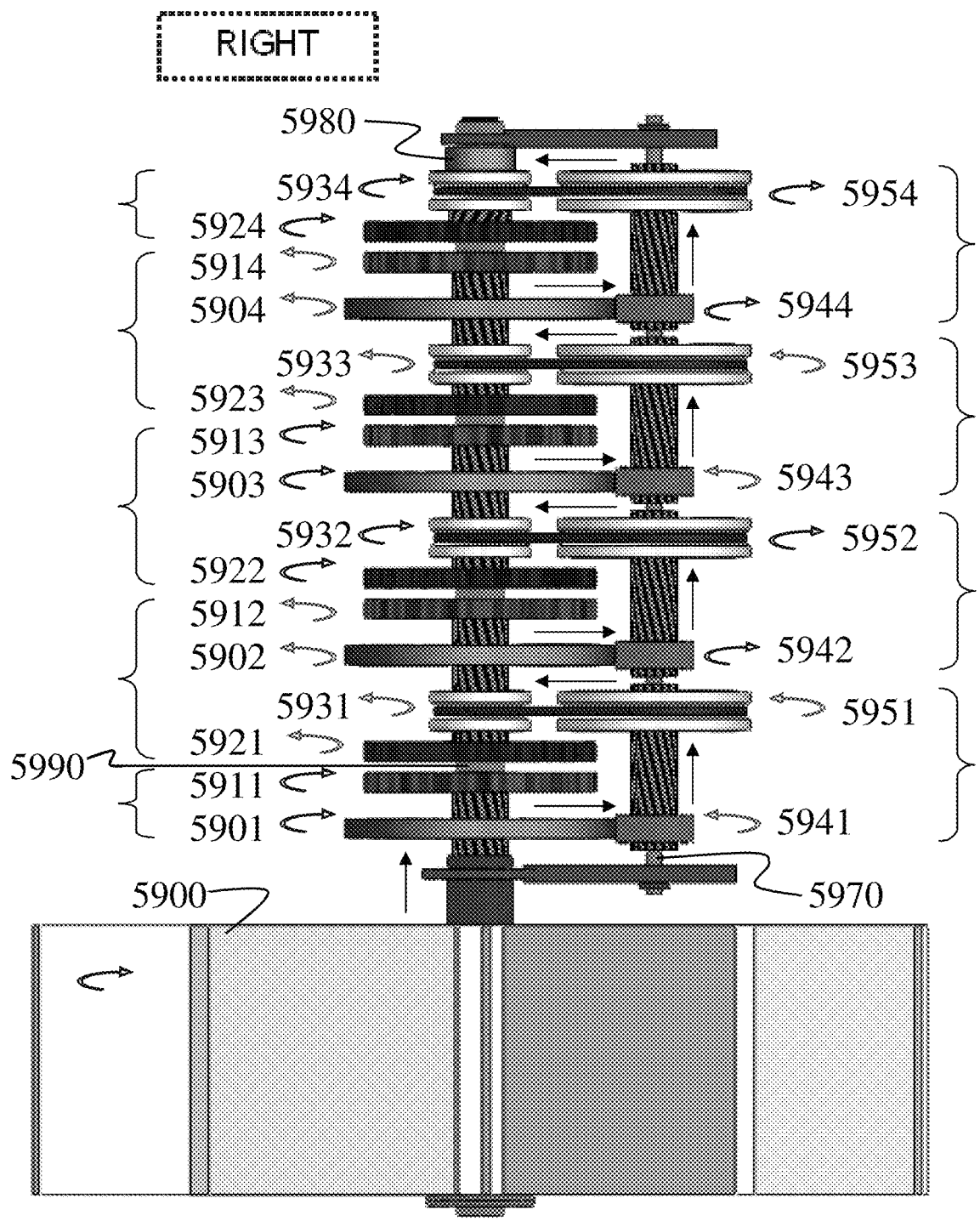

FIGS. 17, 18 demonstrate another example of how to double or more the relative rotational speed obtained between rotor and stator, using an external axle 5970 and multiple gear stages.

In these embodiments, a number of generators (four in this case) which have counter-rotating rotors and stators are placed on a primary axle 5990 of the turbine rotor (power input rotor) 5900.

When the turbine rotor spins, in any direction, wheel 5901 and rotor 5911 are spinning with it, in the same direction and at the same angular velocity.

The spinning of wheel 5901 (preferably large radius) will cause an opposite rotation of both wheel 5941 (preferably small radius) and wheel 5951, at a faster angular velocity than wheel 5901.

The opposite spinning of wheel 5951 (preferably large radius) will cause a rotation of elements: stator 5921, wheel 5931 (preferably small radius), wheel 5902, rotor 5912, in the same opposite direction as wheel 5951, and at a faster angular velocity than wheel 5951.

The rotor 5911 and its stator 5921 are now spinning one against the other at more than double of the spinning speed of the turbine rotor.

The opposite spinning of wheel 5902 (preferably large radius) will cause a rotation of both wheel 5942 (preferably small radius) and wheel 5952, and in a faster angular velocity than wheel 5902.

The spinning of wheel 5952 (preferably large radius) will cause a rotation of elements: stator 5922, wheel 5932 (preferably small radius), wheel 5903, and rotor 5913, in the same direction as wheel 5952, and at a faster angular velocity than wheel 5952.

The rotor 5912 and its stator 5922 are now spinning one against the other in a much larger speed than the first generator set (rotor 5911 and stator 5921).

The spinning of wheel 5903 (preferably large radius) will cause an opposite rotation of both wheel 5943 (preferably small radius) and wheel 5953, at a faster angular velocity than wheel 5903.

The opposite spinning of wheel 5953 (preferably large radius) will cause rotation of elements: stator 5923, wheel 5933 (preferably small radius), wheel 5904, rotor 5914, at the same direction as wheel 5953, and in a faster angular velocity than wheel 5953.

The rotor 5913 and its stator 5923 are now spinning one against the other in a much larger speed than the second generator set (rotor 5912 and stator 5922).

The opposite spinning of wheel 5904 (preferably large radius) will cause a rotation of both wheel 5944 (preferably small radius) and wheel 5954, in a faster angular velocity than wheel 5904.

The spinning of wheel 5954 (preferably large radius) will cause rotation of elements: stator 5924 and wheel 5934

(preferably small radius), in the same direction as wheel 5954, and in a faster angular velocity than wheel 5954.

The rotor 5914 and its stator 5924 are now spinning one against the other in much larger speed than the third generator set (rotor 5913 and stator 5923).

This arrangement will cause an opposite rotation between rotors and stators, while increasing the relative rotational speed between the rotor and stator pairs in each gear stage that is added, starts from the second gear stage.

In the example shown in FIG. 18, if "N" is equal to "Revolutions per Minute" (RPM) of the turbine rotor, and if "Gi" presents the gear ratio of the "i"th gear stages involve (eight gear stages in this illustration), then the relative speed of the counter rotating rotor/stator pair:

$$5911 \text{ and } 5921 = N + N \cdot G1 \cdot G2$$

$$5912 \text{ and } 5922 = N \cdot G1 \cdot G2 + N \cdot G1 \cdot G2 \cdot G3 \cdot G4$$

$$5913 \text{ and } 5923 = N \cdot G1 \cdot G2 \cdot G3 \cdot G4 + N \cdot G1 \cdot G2 \cdot G3 \cdot G4 \cdot G5 \cdot G6$$

$$5914 \text{ and } 5924 = N \cdot G1 \cdot G2 \cdot G3 \cdot G4 \cdot G5 \cdot G6 + N \cdot G1 \cdot G2 \cdot G3 \cdot G4 \cdot G5 \cdot G6 \cdot G7 \cdot G8$$

If, for the simplicity, all the eight gear stages involve in this teachable example are having an equal gear ratio (not as in the figure), then the relative speed of the counter rotating rotor/stator pair:

$$5911 \text{ and } 5921 = N \cdot (1 + G^2)$$

$$5912 \text{ and } 5922 = N \cdot (G^2 + G^4)$$

$$5913 \text{ and } 5923 = N \cdot (G^4 + G^6)$$

$$5914 \text{ and } 5924 = N \cdot (G^6 + G^8)$$

If "N" would be 6, and if "G" would be 5, for each of the eight gear stages presented in this illustration, then the relative speed of the counter rotating rotor/stator pair:

$$5911 \text{ and } 5921 = 156 \text{ RPM}$$

$$5912 \text{ and } 5922 = 3,900 \text{ RPM}$$

$$5913 \text{ and } 5923 = 97,500 \text{ RPM}$$

$$5914 \text{ and } 5924 = 2,437,500 \text{ RPM}$$

It is possible to use a crossed belt, band, or chain as well, and/or any other possible opposite transmission means, between the flywheels/wheels/gear wheels/cogwheels or the like, which will allow the two axles shown to be set apart from one another.

It is possible to use a gear wheels/flywheels/cogwheels/wheels and/or any other transmission means between the wheels instead of belts.

Other arrangements are also possible, such as but not limited to, using a different number of generator sets, of the same and/or different types, different numbers of gear stages, at any individual gear ratio, different arrangements of the wheels/flywheels and/or the generators, and otherwise, all of which are within the provision of the invention. Element 5980 (in FIG. 18) is a swivel (or slip ring or the like) adapted to allow the transfer of electric power through a rotating coupling, and can be located on any suitable structure, and can be replaced with any elements allowing one to transfer tension while rotating, including wireless transfer.

Section 10B-C

Figure 19:
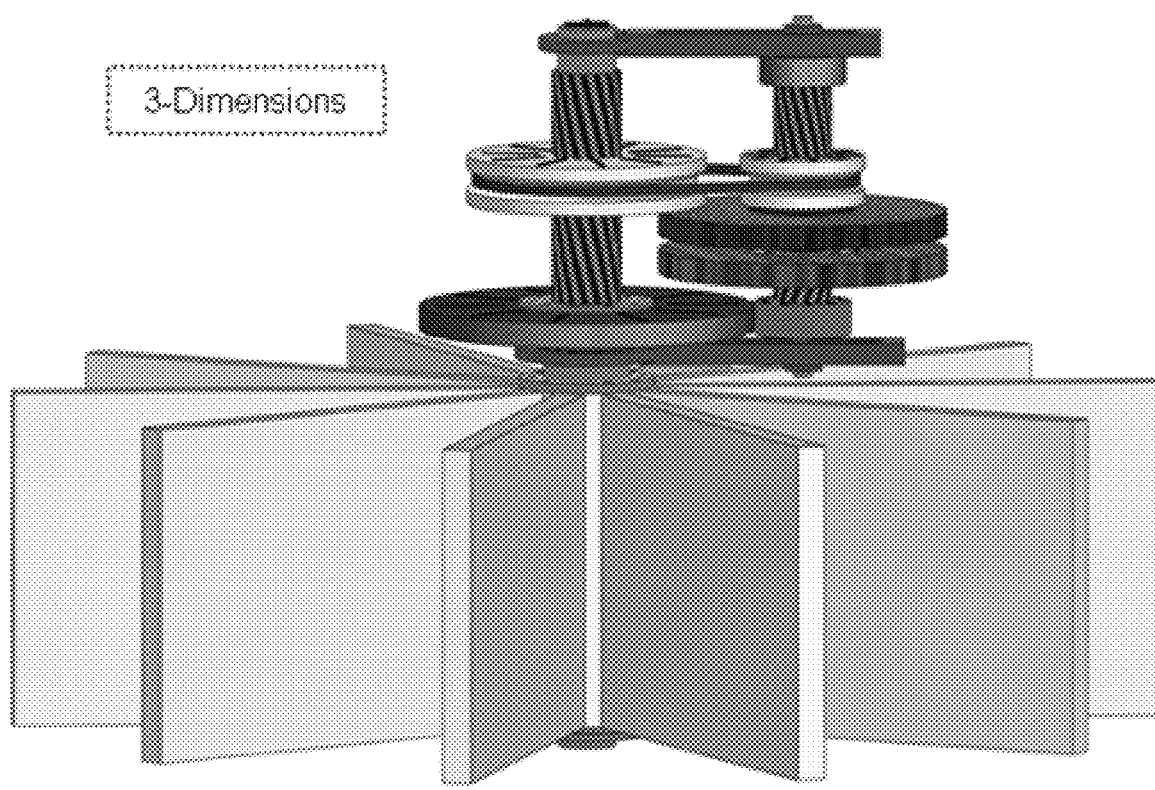
FIG. 19 shows an embodiment using counter-rotating rotors and stators and an external axle in perspective view.

FIG. 19 presents another embodiment of the invention allowing for a relative rotational velocity of double or greater between rotor and stator of a generator set(s). This embodiment uses a single external axle. Here the generator is located on the body of the external axle, instead of located on the turbine rotor, being spun by means of a belt, band, chain, wheels, gear wheels, flywheels, or other transmission means connected to the turbine rotor.

Figure 20:
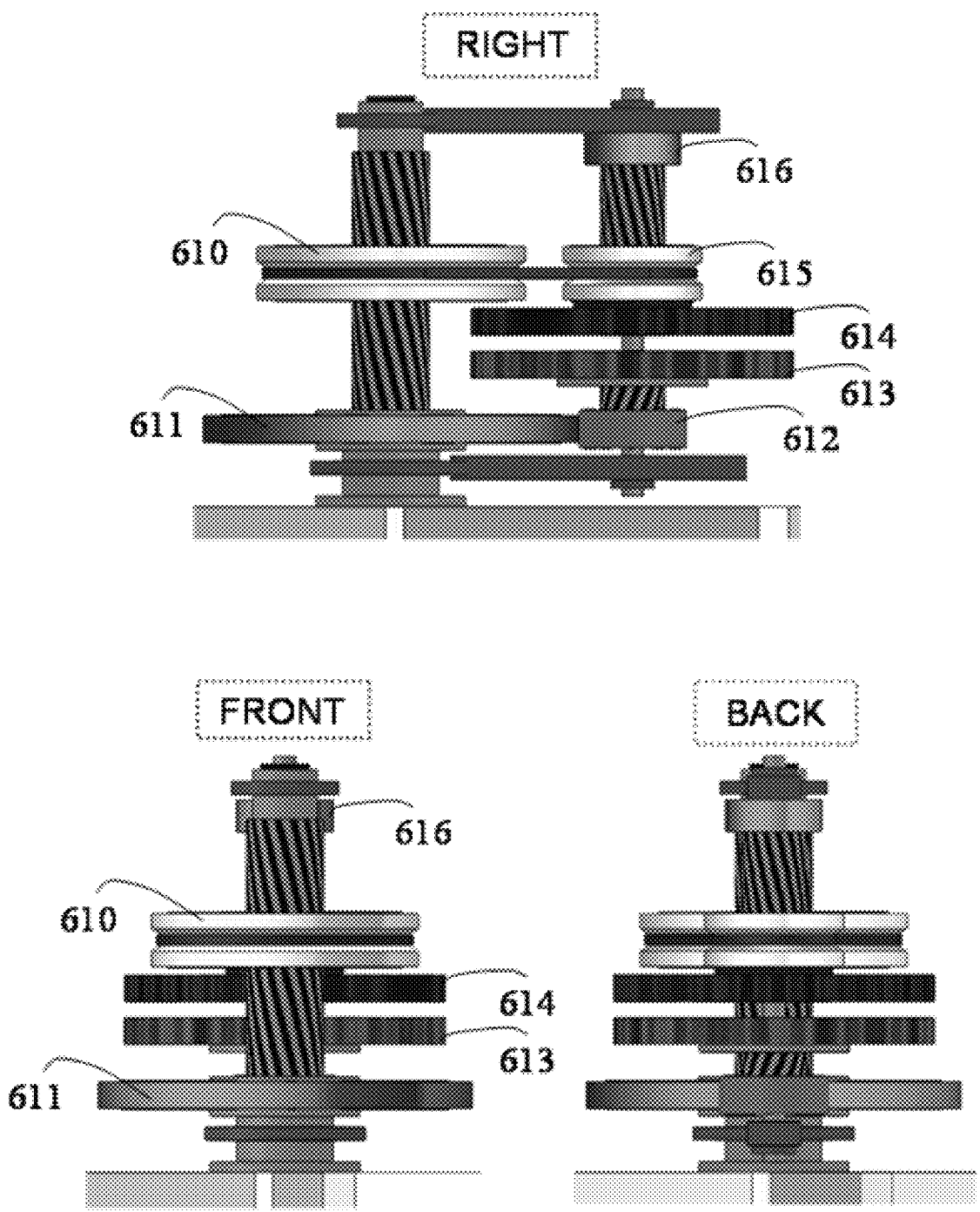
FIG. 20 shows an embodiment using counter-rotating rotors and stators and an external axle in right and front and back views.

FIG. 20 shows a right and front and back close-up of the arrangement described above and depicted in FIG. 19, wherein a single external axle is used and the generator include rotor and counter-rotating stator are disposed upon the external axle.

Wheel 610 and wheel 611 are fixed to the turbine rotor and turns with it, in the same direction and angular velocity.

The rotation of wheel/gear wheel 611 (preferably large radius) will cause counter-rotation of wheel/gear wheel 612 (preferably small radius) which is tangent to the wheel 611 and hence will be turned in the opposite direction from it, and thus of rotor 613 which is fixedly attached to wheel 612.

At the same time, wheel 610 (preferably large radius) which is fixedly attached to the same axle as wheel 611, will turn wheel 615 (preferably small radius) by means of belt, band or chain, in the same direction, and thereby the stator 614 which is fixedly attached to wheel 615.

As is apparent from this arrangement, the desired result of double or greater counter-rotation between rotor and stator has been achieved.

The element 616 of FIG. 20 is a swivel and can be replaced with any element allowing one to transfer tension while rotating including wireless transfer.

Figure 21:
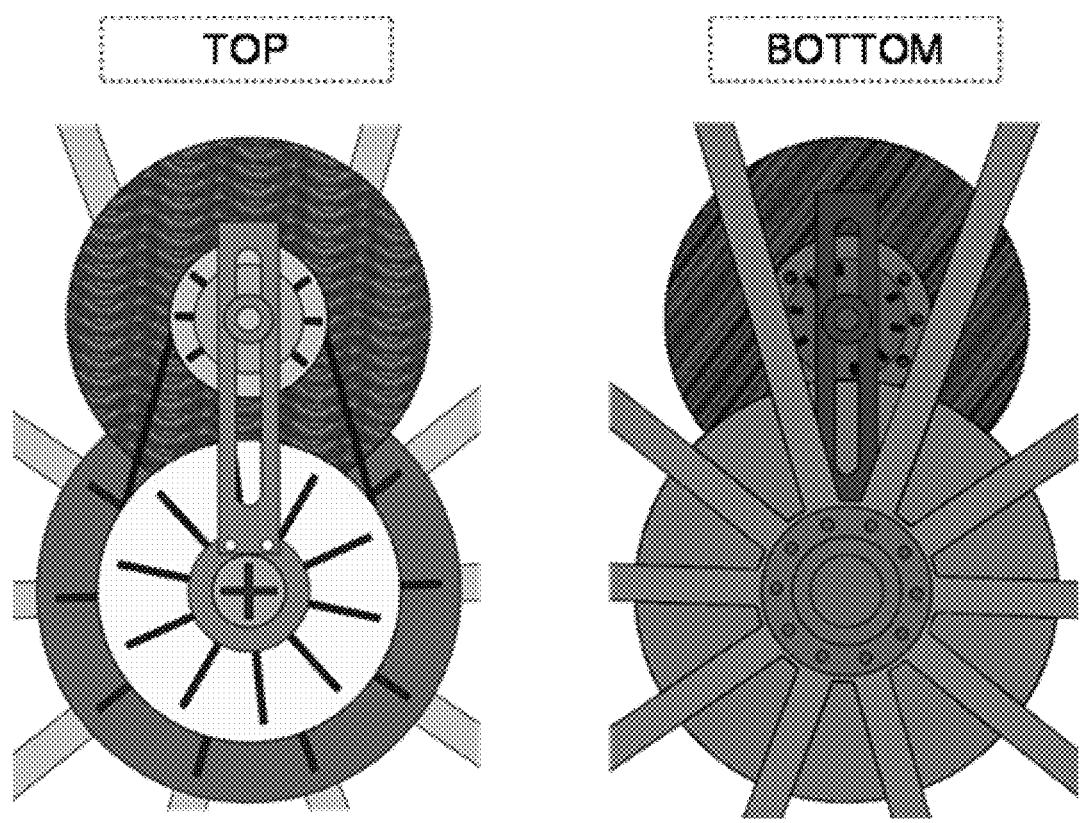
FIG. 21 shows an embodiment using counter-rotating rotors and stators and an external axle in top and bottom views.

FIG. 21 shows top and bottom views of these mechanisms with wheel, drive wheel, belt, and rotor-stator pair.

It is possible to use a crossed belts, bands, or chains as well, and/or any other possible opposite transmission means, between the wheels/gear wheels/cogwheels 611,612 (in FIG. 20), which will allow the two axles shown to be set apart from one another.

It is possible to use a gear wheels/cogwheels/wheels and/or any other transmission means between the wheels 610,615 (in FIG. 20), instead of belts.

Figure 22:
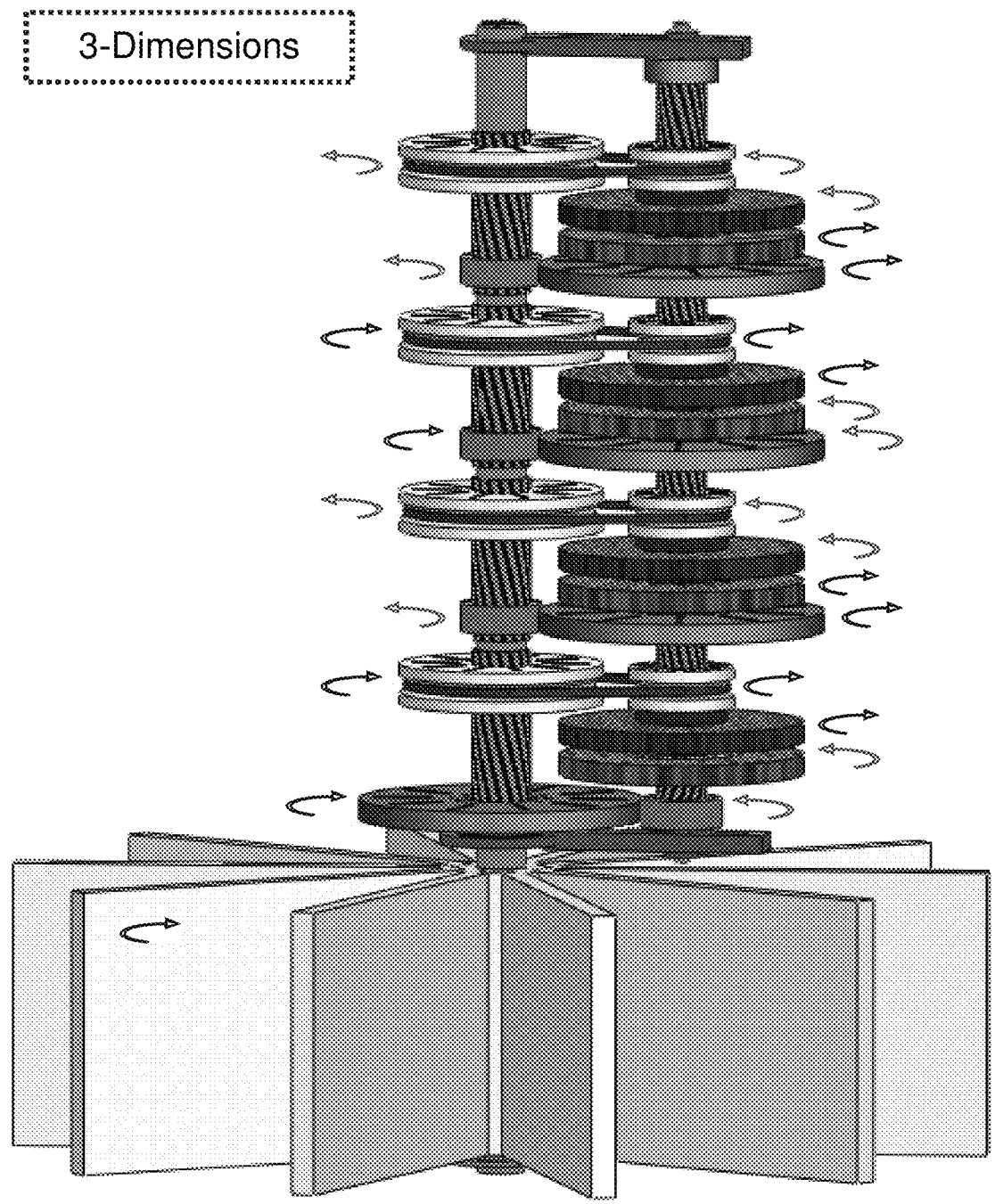
FIGS. 22, 23 show an embodiment using counter-rotating rotor and stator of several generators sets, and an external axle, in perspective and in right views. Each generator set has a greater relative rotational speed between its rotor and stator compared to the previous generator set.
Figure 23:
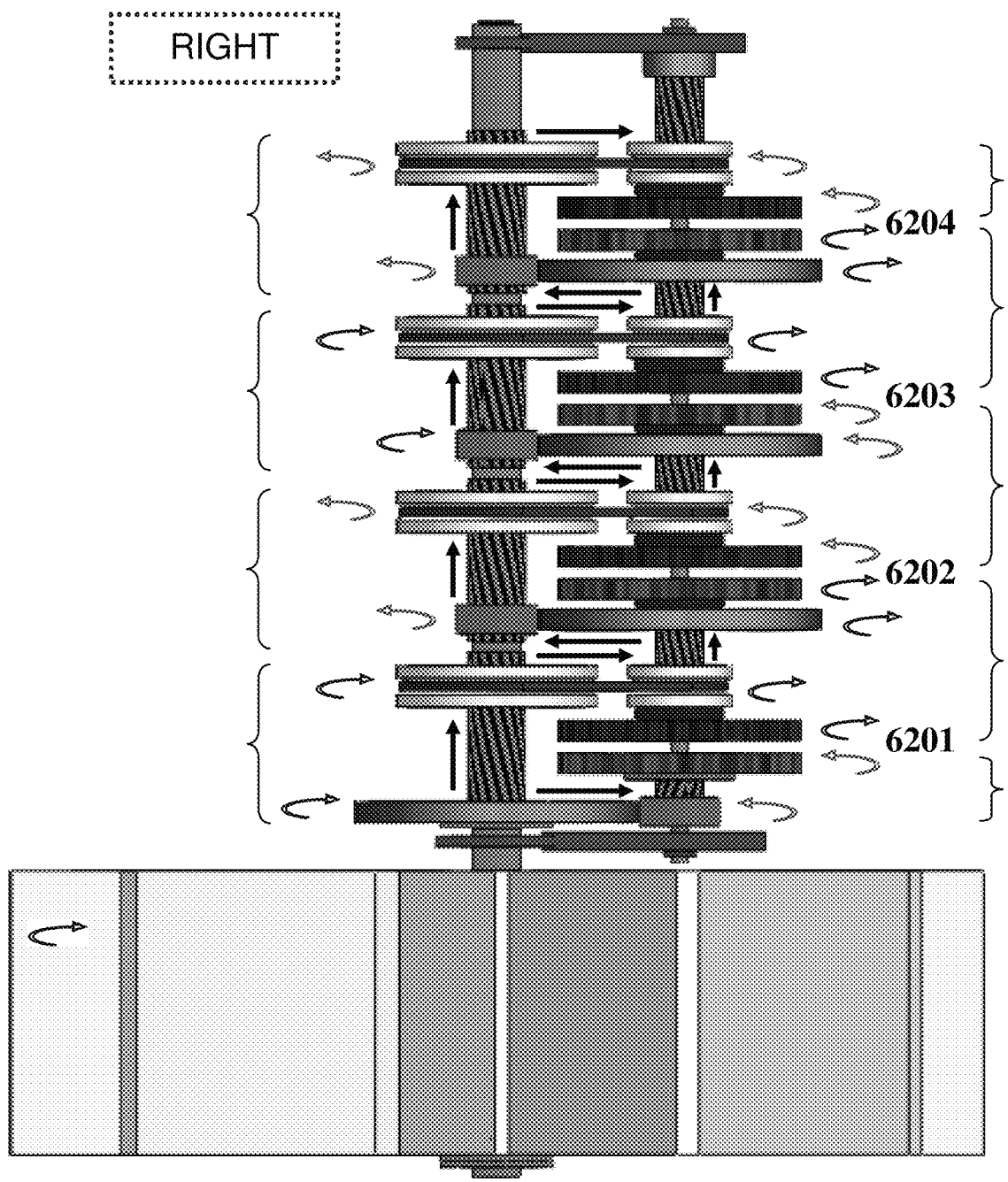

FIGS. 22, 23 show a similar example to that of FIGS. 17, 18, but where the counter rotating rotor/stator pairs 6201, 6202, 6203, 6204 are located on an external axle.

FIG. 24 shows a combination between FIGS. 17, 18 and FIGS. 22, 23 where the rotor/stator pairs 6201, 6202, 6203, 6204 are located in alternating fashion on the external axle and on the turbine rotor.

Other arrangements are also possible, such as but not limited to, using a different number of generator sets, of the same and/or different types, different numbers of gear stages, at any individual gear ratio, different arrangements of the wheels/flywheels and/or the generators, and otherwise, all of which are within the provision of the invention.

Section 10B-D

FIG. 25 is another embodiment allows for spinning the stator in the opposite direction at a relative velocity of double or greater of the rotor by use of a number of external axles.

One or more generators, with rotors spinning in the opposite direction of stators, are located on a number of external axles, and spin by means of a belts, bands, chains, gears, wheels, gear wheels, flywheels, or other transmission means connected to the turbine rotor.

FIG. 25 shows one embodiment of the invention utilizing three rotor-stator pairs which are placed on three external axles attached to a single turbine rotor.

The axle of the turbine rotor spins a number of elements in its direction; the wheel 6301 and three pulley wheels 6302.

As can be seen in FIGS. 25, 26, turning of the wheel 6301 which preferably has a large radius will turn the wheel 6303, which is preferably of small radius which is tangent to the wheel 6301 and hence will be turned in the opposite direction from it.

Turning of the wheel 6303 will directly turn the magnetic plate 6304 in its same opposite direction.

As a result, the magnetic plate 6304 will turn against the direction of the turbine rotor.

Turning of the wheel 6302, which is preferably of large radius, will turn the wheel 6305 which is of preferably small radius, by means of belt, band, chain, or other transmission means in the same direction.

Since the direction of the wheel 6305 is with the direction of the wheel 6302, turning the wheel 6305 will directly turn the copper plate 6306 which is on a shared axle with wheel 6305 in the same direction as well.

As a result the copper plate 6306 will turn in the direction of the turbine rotor.

As a result of these revolutions the magnetic plate 6304 will turn in the opposite direction from the copper plate 6306.

Generally speaking in order to multiply by an even greater amount the relative rotational velocity between the two plates, one can use the following rule of thumb: Large radius wheels should drive smaller radius wheels.

In the above example, the turbine rotor turns the relatively large wheel 6301, which powers the small wheel 6303, which turns the magnetic plate 6304.

The turbine rotor also turns the relatively large wheel 6302 which spins the small wheel 6305, which turns the copper plate 6306, implementing effectively a gear system.

One of the advantages of the invention is a result of intelligent use of relative sizes of the four wheels (6301, 6302, 6303, 6305) along with addition of external axles.

The speed of revolution for each of the two plates will be multiplied by an arbitrary ratio fixed by the sizes of the various wheels involved.

Energy will inevitably lost as a result of friction, but the increased speed of revolution will have its own benefits such as increasing output by operation at large speed and/or decreased material cost.

Insofar as the gear ratio of each stage is greater than one (such that the rotational output speed of each stage is larger than that of the input), a corresponding multiplication of the final relative speed is obtained.

Further illustrations of this concept are shown in FIGS. 27-30.

FIG. 27 shows a perspective view of the concept using two stage multi gear ratio and three external axles.

FIG. 28 shows a top view of the concept.

FIG. 29 shows a front view of the concept.

FIG. 30 shows a back view of the concept.

The same turbine rotor may carry a number of such generator sets, and thus it is possible to generate more energy even in conditions of low flow conditions, since the system allows high gear ratios for generator operation, allowing for operation in arbitrarily low cut-in speeds.

The external axle (one or more) may spin with or against the rotation of the turbine rotor. It can also rotate around the turbine rotor in the same direction.

The element 616 of FIG. 26 is a swivel and can be replaced with any element allowing one to transfer tension while rotating including wireless transfer.

Instead of two flywheels/gear wheels/cogwheels (6301, 6303 in FIG. 26) physically touching each other in order to cause opposing rotation, it is possible to use a chain, belt, band, or cord, and/or any other possible transmission means, that is crossed, or in an opposite direction, and by these means to achieve the reversed rotation, which will allow the two axles to be set apart from one another.

It is possible to use a gear wheels/cogwheels/wheels and/or any other transmission means between the wheels 6302, 6305 instead of belts.

Section 10B-E

It is within provision of the invention to employ one or more generators having counter-rotating rotors and stators, located on the turbine rotor, being spun by means of a belt, band, chain, wheels, gear wheels, flywheels, or other transmission means connected to a number of external axles (not shown in the figures).

Section 10C: Special Means for Counter-Rotation for One or More Turbine Rotors

The use of 'special means' can take several forms:

A). One or more generators fixedly attached to their support, with counter-rotating rotor and stator, using a special bucket-like means connected to the turbine rotor that rotates with it.

B). One or more generators fixedly attached to the turbine rotor, with counter-rotating rotor and stator, using a special bucket-like means fixedly connected to its support, themselves also rotating with the turbine rotor.

As seen in FIGS. 31-33, an outer rim 6801 and inner rim 6810 (fixedly attached to each other) are employed to cause counter-rotation between rotor and stator pair of a generator (five generators in this illustration). The generator elements 6802, 6803 (one of which can be called stator and the other rotor, although both rotate) are attached to plate 6804.

Both outer rim 6801 and inner rim 6810 may spin together in either direction relative to the plate 6804.

One or the other is connected to the turbine rotor and will cause relative rotation which will tend to cause the generator elements 6802, 6803 to rotate in the opposite direction, effectively doubling or otherwise multiplying the relative rotational velocity between generator elements 6802, and 6803, because the radius of outer ring 6801 is larger than the radius of generator element 6802 that meshes with 6801, and the radius of the inner ring 6810 is larger than that of the other generator element 6803 that meshes with 6810.

Elements 6804, 6801 may also be turned in opposite directions in order to further increase the relative rotational velocity between the rotor and stator.

Section 10C-A

One or more generators as shown in FIGS. 31-33 may be attached to fixed support, using an outer rim 6801 and inner rim 6810 fixed to the turbine rotor and rotating with it. The generators again having counter-rotating rotors and stators.

In the example of FIG. 34 the outer rim 6801 and the inner rim 6810 turn with the turbine rotor.

In the figure, a supporting plate 6811 was fixedly added to the base of the outer rim 6801.

Section 10C-B

One or more generators may be attached to the turbine rotor, the generators having rotors and counter-rotating stators in the manner shown in FIG. 35, with the outer rim 6801 fixed to the supporting structure.

In addition to the relative rotation between rotor and stator of the generators, these generators will in effect also rotate with the turbine rotor.

The outer rim 6801 and the inner rim 6810 in this example do not rotate with the turbine rotor.

In FIG. 35, support plate 6811 has been added for the outer rim 6801 and inner rim 6810.

Also, support plate 6850 has been added to the plate 6804.

Various advantages may be pointed out concerning the innovations under consideration.

One may choose various diameters for each pair of gear wheels, for example by means of the adjustment mechanism 6860 (see FIGS. 31, 33) on the plate 6804.

This adjustment mechanism allows one to move the axis of rotation of the generators.

Furthermore external axles may be added where possible, allowing for a wide range of control over the relative rotational speed between stator and rotor.

This will have advantages clear to one skilled in the art, as (for example) a generator running higher Revolutions per Minute (RPM) will require less material (copper or other conductors, and magnets), as well as increasing the output power.

On the same turbine rotor it is possible to connect a number of the rotor/stator pairs, to increase the total power of the device.

The swivel 6855 (one or more), can be replaced with any other mechanism for transferring tension during rotation, including wireless transfer; these can be placed on any appropriate part of the device.

It is possible to use any kind of energy conversion device including plates as in the figures, generators, alternators, hydraulic elements, electromagnetic devices, or the like.

It is within provision of the invention to place the elements 6802 and/or the elements 6803 in opposite locations, for instance on the outside rim of the plate 6801. That is to say, they can rotate on the inner or outer rim of the plate 6801.

They may also conceivably run on the flat plate itself, either on the top or bottom of the plate, in addition to other location(s).

The inner rim 6810 can be either higher or lower than the outer rim 6801.

It is possible to connect another axle perpendicular to or at any other angle to the plate 6801 for example in the same way as a bicycle dynamo connects.

The dynamo may for instance be attached to a turbine rotor blade or to plate 6810.

Any number of plates and stator/rotor pairs may be used, as well as any number of transmission elements.

It is within provision of the invention to use external axles, insofar as possible, and to place any number of such elements around the turbine rotor and/or on top of each other.

It is also possible to use one or more belts, straight or cross or combinations thereof.

Section 10D

It is possible to combine all or part of the provisions mentioned above for purposes of causing rotation in both rotor and stator in opposite directions.

For example, a number of devices such as those described in section 10C can be implemented on a number of external axles (such as those described in section 10B) and/or use of the provisions of 10A,10B, and/or use of the provisions of 10A,10C, or use the provisions of 10A, 10B, and 10C all together.

This has the effect of counter-rotating rotor/stator, multiplied by some fixed transmission ratio.

The inverse rotation devices disclosed in 10C-A and 10C-B may also themselves rotate, opposite from that described above wherein they are fixed rigidly to the turbine rotor or support structure.

The support structure itself may also rotate.

One unique aspect of sections 10A, 10B, 10C, 10D is that here the extra 'external' gear has gear ratio that may be chosen by the designer.

This allowance for implementing wheels of different radius allows for a variety of gear ratios to be chosen.

In FIG. 36 one sees three external axles (in the sense of section 10B-D), on which each has a special means (in the sense of section 10C), each containing five generators.

The transmission means shown is a four-stage transmission.

Of course all the elements of the invention may be located within or outside the shroud if a shroud is being used.

They may be covered by any means, although in the figures the gear trains are exposed in order to better illustrate the concept.

Inverse Exponential Driven Rotation—General

The generator elements may be placed on any suitable section of the device.

They can be on any side of the turbine rotor above or below it, in pairs or triples or the like on one or both sides, as long as there is enough power to rotate them.

It is within provision of the invention to use additional generators, to activate and deactivate based on control signals as necessary to increase or decrease the power of the device.

The foregoing description and illustrations of the embodiments of the invention are not meant to be exhaustive, nor to limit the invention to the above description in any form.

Any term that has been defined above and used in the claims, should be interpreted according to this definition.

The reference numbers in the claims are not a part of the claims, but rather used for facilitating the reading thereof. These reference numbers should not be interpreted as limiting the claims in any form.

Patents related to the disclosure of the invention include the following:

DE19643362 describes a wind generator with a first propeller for the rotor of a generator whose stator is also rotated by a second propeller on the opposite side of the generator. However, further multiplication of the relative speed is not attempted.

Similarly KR20100077135 provides counter-rotating rotor and stator but in a gearless system lacking the ability to arbitrarily multiply the relative rotational speed therebetween.

Likewise GB2341646, CN201232607, CN101725477 provides two sets of blades disposed to rotate in opposite directions and thereby rotate a rotor and stator in opposite directions, but again there is no transmission means in this gearless system and therefore there is no further multiplication of the relative rotational speed.

In US2011206517, counter-rotating elements are used to stabilize the rotation rate of an output shaft such that it has less variation with wind speed than a conventional turbine. The counter-rotating rotor/stator elements are not however driven by gear trains adapted to produce large relative rotational speeds between rotor and stator, but rather to stabilize the speed between rotor and stator and thereby provide a stabilized output frequency.

In U.S. Pat. No. 4,291,233, counter-rotating elements are used to increase the relative rotational speed between counter-rotating rotor/stator elements, where some of its gear stages are connected in a way that two shafts are being driven by one shaft. By that, the model in the quoted patent will never be able to exceed the limit of the maximum overall gear ratio that can be otherwise achieve by a gear system using a stationary stator, when using the same number of gear stages and the same gear ratios involves in those gear stages.

The invention claimed is:

1. A relative counter rotational speed increasing transmission device, comprising:
a power input rotor supported by a primary axle and adapted to be rotated by a motive power source acting on said power input rotor;
one or more external axles mounted on a frame, spaced from the primary axle;
a plurality of rotating elements rotatably supported by the primary axle and/or by one or more of the external axles, comprising:
an input wheel and an output wheel at each of a plurality of trains; the input wheel and the output wheel at each of the trains being two or more transmission means comprising any means for transfer of torque adapted to transfer rotation of an input wheel to an output wheel;
first train is having first input wheel rigidly attached to and rotating with the power input rotor and first output wheel mechanically connected to the first input wheel, thereby the first input wheel is receiving mechanical power from the rotating power input rotor and is transferring said mechanical power and a rotation to the first output wheel;
second train is having second input wheel rigidly attached to and rotating with the first output wheel and second output wheel mechanically connected to the second input wheel, thereby the second input wheel is receiving mechanical power from the first output wheel and is transferring said mechanical power and a rotation to the second output wheel;
additional third train being an additional train to the second train is having third input wheel rigidly attached to and rotating with the second output wheel and third output wheel mechanically connected to the third input wheel, thereby the third input wheel is receiving mechanical power from the second output wheel and is transferring said mechanical power and a rotation to the third output wheel;
additional fourth train being an additional train to the third train is having fourth input wheel rigidly attached to and rotating with the third output wheel and fourth output wheel mechanically connected to the fourth input wheel, thereby the fourth input wheel is receiving mechanical power from the third output wheel and is transferring said mechanical power and a rotation to the fourth output wheel;
additional fifth train being an additional train to the fourth train is having fifth input wheel rigidly attached to and rotating with the fourth output wheel and fifth output wheel mechanically connected to the fifth input wheel, thereby the fifth input wheel is receiving mechanical power from the fourth output wheel and is transferring said mechanical power and a rotation to the fifth output wheel;
additional sixed train being an additional train to the fifth train is having sixed input wheel rigidly attached to and rotating with the fifth output wheel and sixed output wheel mechanically connected to the sixed input wheel, thereby the sixed input wheel is receiving mechanical power from the fifth output wheel and is transferring said mechanical power and a rotation to the sixed output wheel;
additional seventh train being an additional train to the sixed train is having seventh input wheel rigidly attached to and rotating with the sixed output wheel and seventh output wheel mechanically connected to the seventh input wheel, thereby the seventh input wheel is receiving mechanical power from the sixed output wheel and is transferring said mechanical power and a rotation to the seventh output wheel;
additional eighth train being an additional train to the seventh train is having eighth input wheel rigidly attached to and rotating with the seventh output wheel and eighth output wheel mechanically connected to the eighth input wheel, thereby the eighth input wheel is receiving mechanical power from the seventh output wheel and is transferring said mechanical power and a rotation to the eighth output wheel;
the input wheel and the corresponding output wheel of each of at least one of the trains having the corresponding output wheel rotating in a direction opposite to the rotation direction of the input wheel, and the input wheel and the corresponding output wheel of each of at least one remaining of the trains having the corresponding output wheel rotating in the same direction as the rotation direction of the input wheel;
each input wheel having a larger diameter than the corresponding output wheel, determine a ratio of increasing speed of rotation from an input wheel to an output wheel at each train, thereby providing a first increase of the rotational speed of the first output wheel, a second increase of the rotational speed of the second output wheel, and further increases of the rotational speed of the respective output wheels, with each additional respective train that is used;
at least one generator stator and at least one generator rotor at each of one or more electrical generators; each electrical generator having the generator stator or the generator rotor rigidly attached to and rotating with, and thereby receiving mechanical power from any of the second output wheel or the output wheel of one of the additional trains, and having the other of the generator stator or the generator rotor rigidly attached to and rotating with, and thereby receiving mechanical power from any of the power input rotor and/or the first input wheel or the input wheel of one of the trains that are previous to that said one of the additional trains, such that:
the rotating generator stator is adjacent to the rotating generator rotor; and
the rotating generator stator having direction of rotation that is counter to the direction of rotation of the rotating generator rotor, and the rotating generator stator and the rotating generator rotor having a relative counter rotational speed determined by the ratio of increasing speed from an input wheel to an output wheel at each train of the trains involve.

2. The device of claim 1 with one or a plurality of additional trains, each additional respective train is having respective input wheel rigidly attached to and rotating with the output wheel of the train that is one previous train to said each additional respective train and respective output wheel mechanically connected to the respective input wheel, thereby the respective input wheel is receiving mechanical power from the output wheel of the train that is one previous train to said each additional respective train and is transferring said mechanical power and a rotation to the respective output wheel.

* * * * *